US012065363B2

(12) United States Patent
Massey et al.

(10) Patent No.: US 12,065,363 B2
(45) Date of Patent: Aug. 20, 2024

(54) ANTIMICROBIAL CAPTURE SYSTEM WITH CARBON CONTAINER

(71) Applicant: SAFE FOODS CORPORATION, North Little Rock, AR (US)

(72) Inventors: Justin Massey, North Little Rock, AR (US); Tim Yeaman, Russellville, AR (US)

(73) Assignee: SAFE FOODS CORPORATION, North Little Rock, AR (US)

( * ) Notice: Subject to any disclaimer, the term of this patent is extended or adjusted under 35 U.S.C. 154(b) by 0 days.

(21) Appl. No.: 18/172,621

(22) Filed: Feb. 22, 2023

(65) Prior Publication Data

US 2023/0192510 A1 Jun. 22, 2023

Related U.S. Application Data

(63) Continuation of application No. 17/444,950, filed on Aug. 12, 2021, now Pat. No. 11,643,341, which is a
(Continued)

(51) Int. Cl.
*C02F 1/28* (2023.01)
*A23B 4/20* (2006.01)
(Continued)

(52) U.S. Cl.
CPC ............... *C02F 1/283* (2013.01); *A23B 4/20* (2013.01); *A23B 4/22* (2013.01); *A23B 4/30* (2013.01);
(Continued)

(58) Field of Classification Search
CPC . C02F 1/283; C02F 1/008; A23B 4/20; A23B 4/22; A23B 4/30; A23L 3/3526; B01D 15/10; B01D 15/20; B01D 15/203
See application file for complete search history.

(56) References Cited

U.S. PATENT DOCUMENTS

| 176,896 A | 5/1876 | Smith |
| 2,088,497 A | 7/1937 | Tijmstra |
| (Continued) | | |

FOREIGN PATENT DOCUMENTS

| DE | 10/2007/045269 A1 | 4/2009 | |
| WO | WO-9418306 A1 * | 8/1994 | ................ B01F 7/30 |

(Continued)

OTHER PUBLICATIONS

F. Rodríguez-Reinoso, M. Molina-Sabio, and M. T. González, Effect of Oxygen Surface Groups on the Immersion Enthalpy of Activated Carbons in Liquids of Different Polarity, Langmuir 1997 13 (8), 2354-2358, DOI: 10.1021/la961047u (Year: 1997).*

(Continued)

*Primary Examiner* — Chester T Barry
(74) *Attorney, Agent, or Firm* — Haynes and Boone, LLP; Randall C Brown

(57) ABSTRACT

According to one embodiment, a method for removing antimicrobial material from a composition includes providing a container that contains a plurality of carbon elements such as granules, rocks and sheets. The carbon elements are submerged with a liquid and a composition that includes an antimicrobial material is deposited in the container. The carbon elements are configured to remove the antimicrobial material from the composition. The level of the liquid in the container is monitored and controlled to maintain a submerged condition of the carbon elements.

9 Claims, 7 Drawing Sheets

Related U.S. Application Data continuation of application No. 16/856,778, filed on Apr. 23, 2020, now Pat. No. 11,117,815, which is a continuation of application No. 16/052,887, filed on Aug. 2, 2018, now Pat. No. 10,669,165, which is a continuation of application No. 15/625,096, filed on Jun. 16, 2017, now Pat. No. 10,065,869, which is a continuation of application No. 15/174,264, filed on Jun. 6, 2016, now Pat. No. 9,708,198, which is a continuation of application No. 14/886,812, filed on Oct. 19, 2015, now Pat. No. 9,380,797.

(60) Provisional application No. 62/122,591, filed on Oct. 24, 2014.

(51) Int. Cl.
| | |
|---|---|
| *A23B 4/22* | (2006.01) |
| *A23B 4/30* | (2006.01) |
| *A23L 3/3526* | (2006.01) |
| *B01D 15/10* | (2006.01) |
| *B01D 15/20* | (2006.01) |
| *C02F 1/00* | (2023.01) |
| C02F 101/36 | (2006.01) |
| C02F 101/38 | (2006.01) |
| C02F 103/22 | (2006.01) |
| C02F 103/32 | (2006.01) |

(52) U.S. Cl.
CPC ............ *A23L 3/3526* (2013.01); *B01D 15/10* (2013.01); *B01D 15/20* (2013.01); *B01D 15/203* (2013.01); *C02F 1/008* (2013.01); *A23V 2002/00* (2013.01); *C02F 2101/36* (2013.01); *C02F 2101/38* (2013.01); *C02F 2103/22* (2013.01); *C02F 2103/32* (2013.01); *C02F 2209/42* (2013.01); *C02F 2209/44* (2013.01); *C02F 2303/16* (2013.01)

(56) References Cited

U.S. PATENT DOCUMENTS

| | | | | |
|---|---|---|---|---|
| 2,724,581 | A | * | 11/1955 | Pahl .......... B67C 3/22 366/601 |
| 3,239,095 | A | | 3/1966 | Jones |
| 3,339,345 | A | | 9/1967 | Sebald et al. |
| 3,911,140 | A | * | 10/1975 | Osborne .......... A23C 19/0323 435/813 |
| 4,009,105 | A | * | 2/1977 | Jeris .......... C02F 3/06 210/151 |
| 4,251,374 | A | | 2/1981 | Cunningham |
| 4,366,920 | A | | 1/1983 | Greenfield, Jr. et al. |
| 4,376,702 | A | * | 3/1983 | Small .......... E03F 1/006 210/201 |
| 4,433,631 | A | | 2/1984 | Lindhal |
| 4,566,971 | A | * | 1/1986 | Reimann .......... C02F 3/087 210/627 |
| 4,663,047 | A | | 5/1987 | Krauthausen et al. |
| 4,933,078 | A | | 6/1990 | Komadina |
| 4,945,060 | A | | 7/1990 | Turner et al. |
| 4,996,070 | A | | 2/1991 | Nafisi-Movagher |
| 5,058,612 | A | | 10/1991 | Winsted |
| 5,126,050 | A | | 6/1992 | Irvine et al. |
| 5,133,860 | A | | 7/1992 | Tai |
| 5,211,848 | A | | 5/1993 | Friday et al. |
| 5,221,470 | A | | 6/1993 | McKinney |
| 5,227,071 | A | | 7/1993 | Torline et al. |
| 5,314,855 | A | | 5/1994 | Thorpe et al. |
| 5,354,458 | A | | 10/1994 | Wang et al. |
| 5,399,541 | A | | 3/1995 | Ishii et al. |
| 5,415,786 | A | * | 5/1995 | Martin .......... C02F 1/78 210/604 |
| 5,421,883 | A | | 6/1995 | Bowden |
| 5,968,338 | A | | 10/1999 | Hulme et al. |
| 5,980,738 | A | * | 11/1999 | Heitkamp .......... C12N 11/00 210/150 |
| 6,083,862 | A | | 7/2000 | Wheelock |
| 6,126,810 | A | | 10/2000 | Fricker et al. |
| 6,455,086 | B1 | | 9/2002 | Trinh et al. |
| 6,706,855 | B1 | | 3/2004 | Collins et al. |
| 6,742,720 | B2 | | 6/2004 | Nolen |
| 6,783,743 | B1 | | 8/2004 | Starner |
| 6,864,269 | B2 | | 3/2005 | Compadre et al. |
| 7,347,942 | B2 | | 3/2008 | Côté et al. |
| 8,685,252 | B2 | | 4/2014 | Vuong et al. |
| 9,181,108 | B2 | | 11/2015 | Pacary et al. |
| 9,380,797 | B2 | * | 7/2016 | Massey .......... C02F 1/008 |
| 9,491,953 | B2 | | 11/2016 | Massey et al. |
| 9,708,198 | B2 | | 7/2017 | Massey et al. |
| 9,924,727 | B2 | | 3/2018 | Massey et al. |
| 10,065,869 | B2 | | 9/2018 | Massey et al. |
| 10,070,659 | B2 | | 9/2018 | Massey et al. |
| 10,252,951 | B2 | * | 4/2019 | Bontchev .......... C10B 57/02 |
| 10,368,556 | B2 | | 8/2019 | Massey et al. |
| 10,575,540 | B2 | | 3/2020 | Massey et al. |
| 10,660,352 | B2 | | 5/2020 | Massey et al. |
| 10,669,165 | B2 | | 6/2020 | Massey et al. |
| 10,701,948 | B2 | | 7/2020 | Massey et al. |
| 2001/0043508 | A1 | * | 11/2001 | Zhou .......... C12M 23/38 366/601 |
| 2002/0009332 | A1 | * | 1/2002 | Sugawa .......... B09C 1/10 405/128.7 |
| 2002/0031822 | A1 | * | 3/2002 | van der Wel .......... C12M 27/06 366/318 |
| 2002/0064585 | A1 | | 5/2002 | Christianson et al. |
| 2002/0074292 | A1 | | 6/2002 | Schlegel et al. |
| 2003/0094422 | A1 | | 5/2003 | Perkins et al. |
| 2004/0195167 | A1 | | 10/2004 | Kamo et al. |
| 2005/0098497 | A1 | | 5/2005 | Khudenko |
| 2005/0153032 | A1 | | 7/2005 | Hilgren et al. |
| 2005/0176140 | A1 | * | 8/2005 | Benedict .......... C12M 27/02 435/366 |
| 2005/0258093 | A1 | * | 11/2005 | Cueman .......... B01J 20/20 210/501 |
| 2006/0102562 | A1 | | 5/2006 | Cannon |
| 2007/0081419 | A1 | * | 4/2007 | Mou .......... B01F 35/55 366/601 |
| 2007/0166441 | A1 | | 7/2007 | Adams et al. |
| 2009/0057228 | A1 | | 3/2009 | Graham et al. |
| 2009/0107919 | A1 | | 4/2009 | Burba et al. |
| 2009/0130740 | A1 | * | 5/2009 | Ophardt .......... C12M 23/40 222/1 |
| 2009/0169439 | A1 | | 7/2009 | Lo et al. |
| 2009/0196967 | A1 | | 8/2009 | Nolen et al. |
| 2010/0330615 | A1 | | 12/2010 | Neto |
| 2011/0139726 | A1 | | 6/2011 | Jin et al. |
| 2011/0309036 | A1 | | 12/2011 | Hussam et al. |
| 2012/0031849 | A1 | | 2/2012 | Britton |
| 2012/0255896 | A1 | | 10/2012 | Courtemanche et al. |
| 2013/0161261 | A1 | | 6/2013 | Widirstky et al. |
| 2013/0294837 | A1 | * | 11/2013 | Leifer .......... E02B 15/06 405/62 |
| 2014/0027378 | A1 | * | 1/2014 | Josse .......... C02F 3/2813 210/615 |
| 2014/0370172 | A1 | | 12/2014 | Nolen et al. |
| 2015/0021258 | A1 | | 1/2015 | Massey et al. |
| 2015/0167024 | A1 | | 6/2015 | Dorri et al. |
| 2016/0075827 | A1 | * | 3/2016 | Welch .......... B01J 19/006 528/335 |

FOREIGN PATENT DOCUMENTS

| | | |
|---|---|---|
| WO | WO 2001/054502 | 8/2001 |
| WO | WO 2004/043162 A2 | 5/2004 |

(56) References Cited

FOREIGN PATENT DOCUMENTS

| WO | WO 2007/084607 | 7/2007 |
|---|---|---|
| WO | WO 2014/113895 A1 | 7/2014 |

OTHER PUBLICATIONS

International Search Report and Written Opinion for International Application No. PCT /US2016/058523 dated Jan. 31, 2017. (18 pages).

International Search Report and Written Opinion of the International Searching Authority, dated Jan. 7, 2016, issued by the ISA/US in International Application No. PCT/US2015/056228.

International Preliminary Examination Report, dated Sep. 29, 2005, issued by the US IPEA in International Application No. PCT/US2003/035933.

U.S. Appl. No. 62/048,024, filed Sep. 9, 2014 (Inventor: Tim F. Yeaman).

U.S. Appl. No. 14/846,251, filed Sep. 4, 2015 (Inventor Justin Massey et al.).

Poddar, et al., "A Review on the Use of Rapid Small Scale Column Test (RSSCT) on Predicting Adsorption of Various Contaminants," IOSR J. Environ., Sci., Toxicol., and Food Tech., vol. 3, Issue 1 (Jan.-Feb. 2013), pp. 77-85.

Chen., et al., "Arsenic Removal by Tailored Activated Carbon at Ambient pH," Water research Foundation, 2009, 50p.

Putra, "Performance of activated carbon and bentonite for adsorption of amoxicillin from wastewater: Mechanisms, isotherms and kinetics," Water Research, 43 (2009) 2419-2430 (Year: 2009).

Lindsey, "Analysis of Trace Levels of Sulfonamide and Tetracycline Antimicrobials in Groundwater and Surface Water Using Solid-Phase Extraction and Liquid Chromatography/Mass Spectrometry," Anal. Chem. 2001, 73, 4640-4646 (Year: 2001).

Huang, C. H.; Renew, J. E.; Smeby, K. L.; Pinkerston, K.; Sedlak, D. L., "Assessment of Potential Antibiotic Contaminants in Water and Preliminary Occurrence Analysis," Water Res. Update 2001, 120, 30 (Year: 2001).

Jafari, R., et al., Characterization of Minimum Impeller Speed for Suspension of Solids in Liquid at High Solid Concentration, Using Gamma-Ray Densitometry, International Journal of Chemical Engineering vol. 2012, Article ID 945314, 15 pages doi:10.1155/ 2012/ 945314 (Year: 2012).

Bizhaem, H.K.; Tabrizi, H.B. Experimental study on hydrodynamic characteristics of gas-solid pulsed fluidized bed. Powder Technol . 2013, 237, 14-23 (Year: 2013).

* cited by examiner

ANTIMICROBIAL CAPTURE SYSTEM WITH CARBON CONTAINER

RELATED APPLICATIONS

The present application is a continuation of U.S. patent application Ser. No. 17/444,950, filed on Aug. 12, 2021, which is a continuation of U.S. patent application Ser. No. 16/856,778, filed Apr. 23, 2020 now U.S. Pat. No. 11,117,815, which is a continuation of U.S. patent application Ser. No. 16/052,887, filed Aug. 2, 2018, now U.S. Pat. No. 10,669,165, which is a continuation of U.S. patent application Ser. No. 15/625,096, filed Jun. 16, 2017, now U.S. Pat. No. 10,065,869, which is a continuation of U.S. patent application Ser. No. 15/174,264, filed Jun. 6, 2016, now U.S. Pat. No. 9,708,198, which is a continuation of U.S. patent application Ser. No. 14/886,812, filed Oct. 19, 2015, now U.S. Pat. No. 9,380,797, which claims the benefit of U.S. Provisional Application No. 62/122,591, filed Oct. 24, 2014 the entire disclosures of which are incorporated herein by reference.

TECHNICAL FIELD

This disclosure relates to antimicrobials, and more particularly to an antimicrobial capture system.

BACKGROUND

Typically, an antimicrobial application system may be used to apply an antimicrobial composition to one or more items, such as poultry carcasses. Disposal of the antimicrobial composition, however, may be problematic because the antimicrobials included in the antimicrobial composition may prevent the antimicrobial composition from being disposed of in a traditional manner, such as a wastewater system. Various antimicrobial capture systems have been utilized to remove antimicrobials from the antimicrobial composition prior to disposal. These typical antimicrobial capture systems, however, may be deficient.

SUMMARY

According to one embodiment, a container for removing antimicrobials from an antimicrobial composition includes a container body having an exterior and an interior. The container body interior is at least partially filled with a plurality of carbon granules configured to remove a portion of the antimicrobials in the antimicrobial composition. The plurality of carbon granules at least partially fill the container body interior to a fill height of the container body. The container body interior is further filled with a liquid to at least a level that completely submerges each of the plurality of carbon granules. The liquid includes an amount of an initial liquid, an amount of the antimicrobial composition, or both. The container also includes an agitator positioned at a bottom of the container body interior. The agitator is configured to agitate at least a portion of the plurality of carbon granules by producing air bubbles in the liquid. The container further includes a drain positioned within the container body interior and configured to drain liquid out of the container body interior. The container further includes a stand pipe coupled to the container body exterior and further coupled to the drain. The stand pipe extends in a vertical direction along the container body exterior. The stand pipe is configured to receive the liquid from the drain and redirect the liquid in the vertical direction along the container body exterior. The container further includes a drainage valve coupled to the stand pipe. The drainage valve is located at a position that is vertically above the fill height of the container body to which the plurality of carbon granules fill the container body interior. The drainage valve is configured to drain liquid received in the stand pipe. The location of the drainage valve is configured to prevent the drainage valve from lowering a current level of the liquid below the level that completely submerges each of the plurality of carbon granules. The container further includes a container lid removably coupled to the container body. The container lid is configured to seal the container, and includes an inlet for receiving the antimicrobial composition.

Certain embodiments of the disclosure may provide one or more technical advantages. For example, the carbon granules included in the container body interior may be completely submerged by the liquid for a particular amount of time, such as throughout the operation of the container. In particular embodiments, by keeping the carbon granules completely submerged by the liquid, the useful life of the carbon granules may be extended by, for example, reducing (or at least partially preventing) the carbon granules from drying out and/or reducing (or at least partially preventing) channeling of the carbon granules. As another example, the carbon granules may be agitated by, for example, an agitator. In particular embodiments, this may reduce (or at least partially prevent) blinding and/or reduce (or at least partially prevent) channeling of the carbon granules. As a further example, the carbon granules in the container may be recycled (or reanimated) following a determination that the carbon granules may no longer be removing the antimicrobials from the antimicrobial composition. In particular embodiments, such a recycling ability may reduce the costs associated with the carbon granules.

Certain embodiments of the disclosure may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure and its features and advantages, reference is now made to the following description, taken in conjunction with the accompanying drawings, in which.

DETAILED DESCRIPTION

Figure 1:
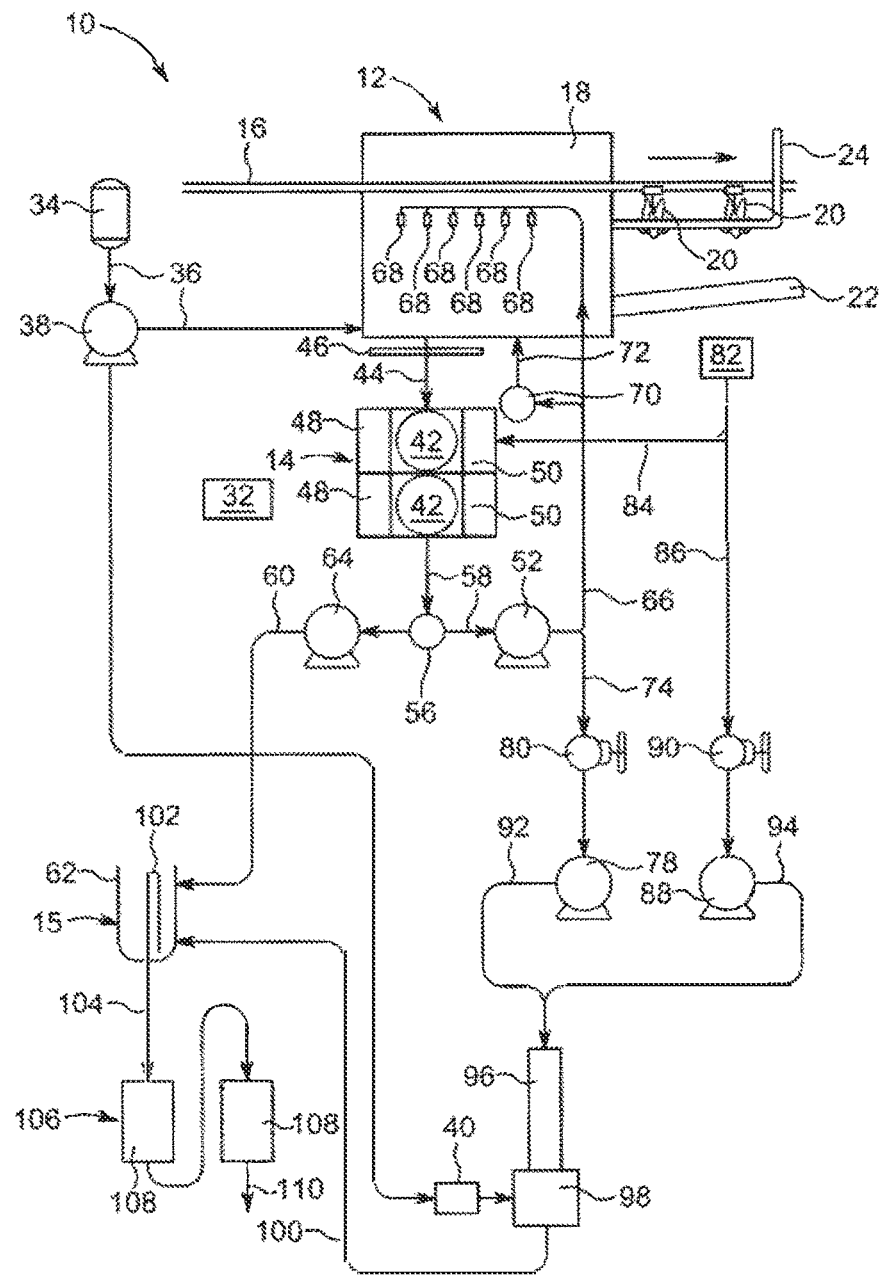
FIG. 1 is a schematic view of an antimicrobial system.
Figure 2:
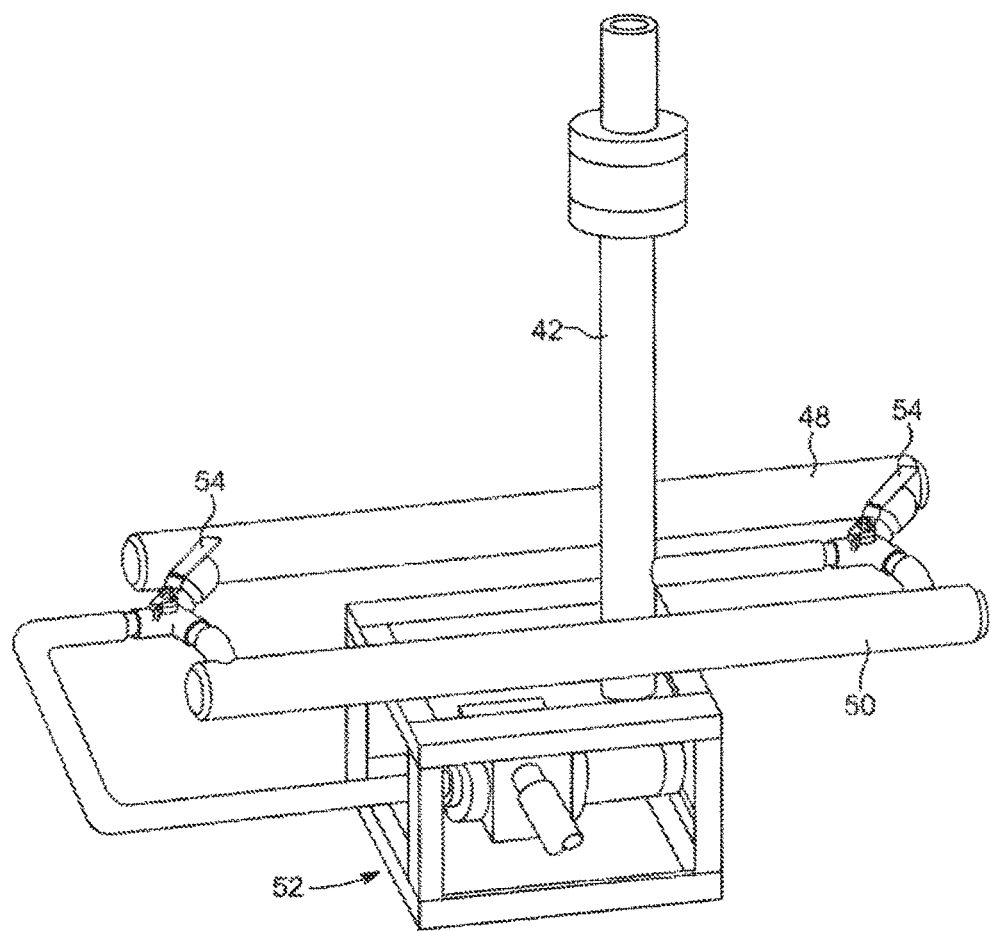
FIG. 2 is a side elevation view of a portion of an antimicrobial recycle system.

Embodiments of the present disclosure are best understood by referring to FIGS. 1-3 of the drawings, like numerals being used for like and corresponding parts of the various drawings.

Antimicrobial System

FIG. 1 is a schematic view of an example antimicrobial system 10. As illustrated, the antimicrobial system 10 includes an antimicrobial application system 12, an antimicrobial recycle system 14, and an antimicrobial capture system 15.

The antimicrobial application system 12 may be configured to apply an antimicrobial composition to one or more work pieces 20. For example, the antimicrobial application system 12 may be configured to apply an antimicrobial composition to one or more raw poultry carcasses. The antimicrobial application system 10 may be any apparatus or system for applying an antimicrobial composition to one or more work pieces 20. For example, the antimicrobial application system 12 may take the general form of one of the embodiments of a spray application system as disclosed in U.S. Pat. No. 6,742,720, issued Jun. 1, 2004 and entitled "Spray Application System," the disclosure of which is incorporated herein by reference. Furthermore, the liquid barriers described in U.S. Pat. No. 6,742,720 may not (or may) be utilized in the antimicrobial application system 12, in particular embodiments. The antimicrobial application system 12 is not limited to those embodiments discussed in detail in U.S. Pat. No. 6,742,720, or to spray application systems in general.

The antimicrobial application system 12 may apply a composition such as an antimicrobial composition to any number of different kinds and types of work pieces 20 in any number of different ways. Methods of application used by the antimicrobial application system 12 may include, but are not limited to, spraying, misting, fogging, immersing, pouring, dripping, any other method of application, or any combination of the preceding. The antimicrobial composition may include one or more antimicrobials. An antimicrobial may be any type of antimicrobial for treating (or otherwise being applied to) work pieces 20 (such as, for example, poultry carcasses). For example, the antimicrobial may be a quaternary ammonium compound, an alkylpyridinium chloride, a cetylpyridinium chloride, any other antimicrobial for treating (or otherwise being applied to) work pieces 20, or any combination of the preceding.

The system 10 may be used to treat a wide variety of different work pieces 20, including, but not limited to, meat, poultry, fish, fresh and salt water seafood, fruits, vegetables, other foodstuffs, animals, food packaging, items and surfaces related to food or food processing, or any combination of the preceding. The work pieces 20 may be live, dead, raw, hide-on, carcass, pieces, cooked, prepared, processed, partially processed, ready to eat, ready to cook, or any combination of the preceding. Furthermore, the system 10 may be used to treat work pieces 20 completely unrelated to food or food processing items.

According to the illustrated embodiment, the antimicrobial application system 12 includes a conveyor 16 that may pass through a housing 18 for moving work pieces 20, such as raw poultry, through the housing 18. As described in more detail below, a drip tray or pan 22 may extend downstream of the housing 18, disposed below the conveyor 16 and the work pieces 20 carried thereby. A rigid member 24, such as stainless steel tubing, may be affixed to the housing 18, such as at a downstream end of the housing 18. The rigid member 24 may have parallel arms that are aligned on opposite sides of the conveyor line 16. A series of matching openings may be provided in each arm for housing counters or sensors. Protective lenses may provide watertight seals, such as, for example, National Electrical Manufacturers Association (NEMA) 4 seals, to protect the counters from damage that might otherwise occur under the harsh wash-down conditions to which the systems 10 are routinely subjected. In particular embodiments, three counters may be provided in series. As illustrated in FIG. 1, the arms may be disposed so that the counters are aligned to detect the presence or absence of work pieces 20. The use of three counters may provide redundancy and increase accuracy, in particular embodiments. In that regard, the counters may be operably connected to a controller such as a central control unit 32, and the counts taken by the counters (such as, for example, three counters) may be continuously compared. In such embodiments, if one counter provides a reading or count that differs from that provided by the other two counters, the central control unit 32 may be programmed to disregard the reading of the inconsistent counter and rely instead upon the readings of the other two counters. Furthermore, the logic and interpretation of the different readings may be modified in any manner.

The antimicrobial recycle system 14 may be configured to produce the antimicrobial composition. For example, the antimicrobial recycle system 14 may be configured to produce the antimicrobial composition at a predetermined concentration. The antimicrobial recycle system 14 may be further configured to supply the antimicrobial composition to the antimicrobial application system 12. Additionally, the antimicrobial recycle system 14 may be further configured to receive unused portions of the antimicrobial composition, recycle the unused portions of the antimicrobial composition, and re-supply the recycled antimicrobial composition to the antimicrobial application system 12.

In particular embodiments, the antimicrobial recycle system 14 may produce the antimicrobial composition by diluting a concentrated antimicrobial composition (or solution) using, for example, water (or any other solubility enhancing agents) to obtain a dilute antimicrobial composition (or solution) with a particular concentration (such as a predetermined concentration), and may further provide the dilute antimicrobial composition to the antimicrobial application system 12. An antimicrobial source, such as a supply tank 34, may be connected to the housing 18 via an antimicrobial supply line or conduit 36. A chemical feed pump 38 may be disposed in the antimicrobial supply line 36. The pump 38 may be operably connected to a controller 40, as is discussed in detail below. The antimicrobial composition may include one or more antimicrobials. An antimicrobial may be any type of antimicrobial for treating (or otherwise being applied to) work pieces 20 (such as, for example, poultry carcasses). For example, the antimicrobial may be a quaternary ammonium compound, an alkylpyridinium chloride, a cetylpyridinium chloride, any other antimicrobial for treating (or otherwise being applied to) work pieces 20, or any combination of the preceding. The concentrated antimicrobial composition may be a concentrated solution of a quaternary ammonium compound as described in U.S. Pat. No. 6,864,269, issued Mar. 8, 2005 to Cesar Compadre ("Compadre et al.") and entitled "Concentrated, non-foaming solution of quaternary ammonium compounds and methods of use," the disclosure of which is incorporated herein by reference. In particular embodiments, the concentrated solution comprises one or more antimicrobials and one or more solubility enhancing agents (such as, for example, propylene glycol). The quaternary ammonium compound may be present in the concentrated solution in a weight percent of, for example, approximately 40%, and the solubility enhancing agent may be present in the concentrated solution in a weight percent of, for example, approximately 60%. For the diluted antimicrobial composition, the quaternary ammonium compound may be present in the diluted antimicrobial composition in a weight percent of, for example, approximately 0.1% (i.e., 0.1%+/−0.09%) to approximately 1.0% (i.e., 1.0%+/−0.09%). Any number of different antimicrobials and solubility enhancing agents may be used for the antimicrobial composition, and the concentrated and dilute compositions may have any number of different components and compositions, including but not limited to the components and compositions of the concentrated and dilute compositions disclosed in U.S. Pat. No. 6,864,269 (Compadre et al.). In particular embodiments, concerns of adulteration, contamination, or cross-contamination may be eliminated or alleviated because of the broad-spectrum efficacy of the example antimicrobial compositions and because of the filtration and automatic concentration measures.

The antimicrobial recycle system 14 may further include one or more recycle tanks 42. A return line or conduit 44 may extend between the housing 18 and the recycle tank 42 for passing liquid from the housing 18 to the tank 42. In particular embodiments, multiple return lines 44 may be used to connect multiple antimicrobial application systems 12 to the recycle tanks 42. A filter 46 may be disposed in the housing 18 or in the return line 44. The filter 46 may be a wire mesh filter, such as a 100 mesh filter, sized to capture visible particulate matter in the effluent (e.g., liquid waste) from the antimicrobial application system 12. Visible particulate matter in the effluent may be minimal because of upstream washing that may be performed on the work pieces 20. First and second filters 48 and 50 may be associated with each tank 42 and may be disposed between the tank 42 and a system pump 52 to provide for parallel flow between the tank 42 and the system pump 52. Valves 54 (shown in FIG. 2, which illustrates a side elevation view of a portion of an antimicrobial recycle system 14) or other means may be provided for selectively directing liquid passing from the tank 42 to the system pump 52 through either the first filter 48 or the second filter 50. In particular embodiments, this may allow the system 10 to continue operating while one of the filters 48 or 50 is being cleaned, replaced, and/or repaired. A three-way valve 56 may be disposed in conduit 58, as is discussed below. A purge or capture line 60 may pass from the valve 56 to the capture tank 62. A capture pump 64 may be disposed in capture line 60. Although the recycle tank 42 may include an impeller or some other stirring or agitation means, in particular embodiments, no such stirring or agitation means may be used. A feed line 66 may pass from the system pump 52 to the housing 18 and may be connected to one or more sprayers 68. Multiple feed lines 66 may be used, or the feed line 66 may be branched or divided to connect the recycle tank 42 to multiple antimicrobial application systems 12. A bypass conduit 70 having a relief valve 72 may be disposed in the feed line 66. Furthermore, a diverting line 74 may be disposed in the feed line 66. The diverting line 74 may be connected to a dilution pump 78 and have a pressure regulator 80 disposed therein.

A source of potable water 82, such as tap water, may be connected to the recycle tank 42 via water supply line or conduit 84. A diverting line 86 may also be disposed in water supply line 84. The diverting line 86 may be connected to a dilution pump 88 and have a pressure regulator 90 disposed therein. The pressure regulators 80 and 90 may regulate the pressure in lines 74 and 86 to a pressure lower than the pressures in lines 66 and 84. For example, the pressure regulators 80 and 90 may regulate the pressure in lines 74 and 86 to approximately 15 psig. The dilution pumps 78 and 88 may be electrically interlocked to provide for matched, stroke for stroke pumping action. The dilution pumps 78 and 88 may also be sized to provide for a desired, fixed dilution ratio. The dilution ratio may be less than or equal to approximately 1 part dilute composition to 1 part water, less than or equal to approximately 1 part dilute composition to 30 parts water, less than or equal to approximately 1 part dilute composition to 60 parts water, or any other dilution ratio. Conduits 92 and 94 may exit the dilution pumps 78 and 88 and may be disposed to route liquids from the dilution pumps 78 and 88 to a static mixer 96. The static mixer 96 may be type of static mixer, such as an inline, auger style static mixer.

A sensor 98 may be disposed at the discharge end of the static mixer 96. The sensor 98 may be configured to detect the concentration of the antimicrobial in the composition (or solution) exiting the static mixer 96. The sensor 98 may be any number of different types of sensors including, but not limited to, infrared, visible light, or ultraviolet sensors. For example, the sensor 98 may be an ultraviolet light spectrophotometer or UV spec sensor. A controller 40 may operably connect the sensor 98 to the chemical feed pump 38. The controller 40 may be configured to receive a signal from the sensor 98 and send a corresponding on/off signal to the chemical feed pump 38. A discharge line 100 may pass from the sensor 98 to the capture or purge tank 62.

A siphon 102 may be disposed in the capture tank 62 and may be connected to a drain line 104. The drain line 104 may passes from the capture tank 62 to an antimicrobial separation unit 106. The antimicrobial separation unit 106 may include one or more filters 108 or filter units each comprising a container dimensioned to retain a volume of filter material, such as disposable carbon filters, that may selectively remove the antimicrobial from the composition. A disposal line 110 may exit the antimicrobial separation unit 106 for disposing of water and any other components remaining after the antimicrobial is selectively removed. A separation unit 106 may or may not be used, and any number of different separation methods may be used. Furthermore, filters 108 may be disposable or reusable.

The central control unit 32 may be used to control the entire system 10. The central control unit 32 may perform various tasks or functions in association with operation of the system 10. For example, the central control unit 32 may be operatively associated with system processes to collect, process, and/or communicate data indicative of operational states, system conditions, triggering events, component functions, events, or other data. One or more sensors, such as sensor 98, may be operatively associated with the central control unit 32 to detect and to provide signals indicative of system operation conditions or conditions in connection with operation of the system 10, for example. In one embodiment, the central control unit 32 may be programmed to activate, deactivate, or modulate system pumps or valves, to receive, transmit, and/or process data signals in communication with one or more components of the system 10, and/or to process or analyze data communicated from one or more sensors operatively associated with various units of the system. For example, the sensor 98 or another sensor may be configured to detect contaminants or other aspects of fluid composition associated with the fluid recycled through the system 10. The central control unit may include one or more processors or computer systems programmed with software, firmware, or other computer-executable instructions to perform the various functions of the control module. The central control unit 32 may be operatively associated with one or more data transmission devices that may be configured to receive and/or store data received or processed by the central control unit 32. In certain embodiments, the central control unit 32 may communicate signals to one or more indicators that may reflect the activity or function of different aspects of the system 10. For example, one such indicator may include a warning light, or an alert graphical display associated with a local or remote plant monitor.

In an example embodiment of operation, a dilute antimicrobial composition may be prepared and used for one antimicrobial application cycle (such as a spray cycle) that may, for example, last for one day (or any other time period). The dilute antimicrobial composition may then be discarded, disposed of, and/or removed from the system 10 for further processing. The system 10 may be operated in batch mode, in steady-state mode, or in any number of different types or combinations of modes of operation. A new antimicrobial application cycle may begin each morning (or at any other time) with an empty and clean recycle tank 42 and an empty and clean capture tank 62. Before the antimicrobial application system 12 is activated, and before the system pump 52 is turned on, the dilute antimicrobial composition may be prepared. In that regard, a desired amount of tap water may be fed to the recycle tank 42. The recycle tank 42 may be filled to approximately one third to approximately one half of its capacity with potable water. The concentration pump 38 may be activated to feed the concentrated antimicrobial composition to the housing 18, where it drains through return conduit 44, and to the recycle tank 42, until a predetermined amount of the concentrate composition is provided. The concentrate composition combines with the water in the recycle tank 42 to form a dilute solution having a predetermined concentration. The desired ranges of the concentration of antimicrobial in the dilute solution include but are not limited to the concentration ranges of the antimicrobial in the dilute solutions disclosed in U.S. Pat. No. 6,864,269 (Compadre et al.).

Once the desired concentration is obtained in the recycle tank 42, the system pump 52 may be activated, and the dilute antimicrobial composition may be supplied to the antimicrobial application system 12. The dilute antimicrobial composition provided to the antimicrobial application system 12 may not be potable. Still, contamination or cross-contamination of the work pieces 20 may not be a concern because of the safety and broad spectrum efficacy of the dilute antimicrobial composition used. The antimicrobial recycle system 14 may supply the dilute antimicrobial composition to the antimicrobial application unit or units 12 at any number of different flow rates and pressures. These flow rates and pressures may include, but are not limited to, the flow rates and pressures discussed in U.S. Pat. No. 6,742,720. The bypass conduit 70 and relief valve 72 may route a portion of the dilute antimicrobial composition to a lower portion of the housing 18 so that it does not pass through the sprayers 68 and is not applied to the work pieces 20. In particular embodiments, the ratio of dilute composition passing through the bypass conduit 70 versus passing to the sprayers 68 may be greater than or equal to approximately 1:1, greater than or equal to approximately 2:1, or may be any other ratio. The dilute antimicrobial composition passing through the bypass conduit 70 may provide for improved mixing of the captured antimicrobial composition and any concentrate antimicrobial composition that might be added. The use of the bypass conduit 70 and relief valve 72 may provide greater flexibility in providing dilute antimicrobial composition to sprayers 68 at or within desired pressure ranges. The use of the bypass conduit 70 and relief valve 72 may also make it easier to continue to provide dilute antimicrobial composition to the sprayers 68 at a consistent pressure as additional antimicrobial application systems 12 are brought online or taken offline and regardless of the number of antimicrobial application systems 12 that are online.

Once the antimicrobial recycle system 14 is supplying the dilute antimicrobial composition to the antimicrobial application system 12, the work pieces 20 to be processed (such as raw poultry) may be moved by the conveyor 16, through the housing 18, and the dilute antimicrobial composition may be applied to the work pieces 20, such as by spraying. The portion of the dilute antimicrobial composition that does not adhere to the work pieces 20 (e.g., unused portions of the antimicrobial composition) may collect in a drain and be returned via return line 44, through filter 46, and to the recycling tank 42 for recycling and reuse. The length of the drip tray 22 may be selected so that it will catch drops from work pieces 20 exiting the housing 18 for approximately 1 minute (or any other amount of time) after the work pieces 20 exit the housing 18. This may enhance the recovery of the dilute antimicrobial composition and reduce downstream losses. In particular embodiments, liquid barriers such as water spray curtains may be used in the housing 18. Also, the work pieces 20 may be wet from upstream washing, so additional water may enter the recycle tank 42, decreasing the concentration of the antimicrobial in the dilute antimicrobial composition.

In particular embodiments, it may be desirable to avoid concentration spikes in the dilute antimicrobial composition, particularly in the dilute antimicrobial composition exiting the sprayers 68 and passing through the diverting line 74 for routing to sensor 98. Accordingly, steps may be taken to insure thorough mixing of the dilute antimicrobial composition being recycled between the antimicrobial recycle system 14 and the antimicrobial application system 12. This may be one reason why the concentrate supply line 36 may route the concentrated antimicrobial composition to the housing 18 rather than directly to the recycle tank 42. By the time the concentrate antimicrobial composition mixes with dilute antimicrobial compositions from the sprayers 68 and from the bypass line 70, passes through return line 44, filter 44, recycle tank 42, filter 48 or 50, and system pump 52, the resultant liquid may be thoroughly mixed and have a relatively uniform composition.

A sensor 98, such as a spectrophotometer, may be used to measure very low concentrations of a component in a composition. It therefore may be advantageous to provide a liquid that has not only has a relatively uniform composition but also a very low concentration of the antimicrobial or component to be measured. Often, it may not be practical or feasible to obtain accurate, reliable readings for the antimicrobial at the concentration ranges typically found in the recycle tank 42. Diluting the composition before taking a concentration reading may offer greater flexibility in the selection of a sensor 98 for monitoring the concentration of the antimicrobial. Samples of the antimicrobial composition exiting the recycle tank 42 may therefore be taken and further diluted, to yield further diluted antimicrobial compositions in which the antimicrobial is present within a concentration range that may be readily and accurately measured by the sensor 98. The dilution ratio of the dilution pumps 78 and 88 may be selected to provide the desired degree of dilution, such as within the ranges discussed above. The pumps 78 and 88 may be set on a timer to take samples at a set interval, each sample being taken for a set duration of time. The concentration may be monitored at any number of different intervals and for any number of different durations.

In particular embodiments, the concentration may be continuously monitored. The electrically interlocked pumps 78 and 88 may provide the dilute antimicrobial composition and water in the desired fixed ratio to further dilute the dilute antimicrobial composition. Using electrically interlocked pumps at a desired, fixed dilution ratio may, in particular embodiments, simplify controls needed to operate the system 10. Furthermore, the pumps may not be interlocked, the dilution ratio may not be fixed, and any number of different methods may be used to select, control, and adjust the dilution ratio as desired.

The dilute antimicrobial composition and water may be combined and passed through the static mixer 96 to provide for thorough mixing, further reducing the risk of concentration spikes as the liquid passes the sensor 98. The sensor 98 may sense the concentration of the antimicrobial in the passing liquid. The sensor 98 may be operably connected to the controller 40. Accordingly, if the sensor 98 detects that the concentration of antimicrobial falls below a desired amount (or below a predetermined amount), the controller 40 may activate the chemical feed pump 38 to add more of the concentrated antimicrobial composition into the housing 18 and to bring the concentration of the antimicrobial in the dilute antimicrobial composition back up to the desired (or predetermined) level. In particular embodiments, the system 10 may be configured to allow the potable water to be controlled in this (or similar) fashion as well.

In particular embodiments, it may be undesirable to route the highly diluted liquid that passes the sensor 98 back into the recycle tank 42, so it may be routed to the capture tank 62. The siphon 102 in the capture tank 62 may allow the liquid to collect in the capture tank 62, until the liquid reaches a desired level. When the liquid in the capture tank 62 reaches the desired level, the siphon 102 may empty the capture tank 62, passing the liquid through conduit 104 and to the disposable carbon filters 108 of the antimicrobial separation unit 106. The disposable filters 108 may capture the antimicrobial to selectively remove the antimicrobial from the antimicrobial composition. Using the siphon 102 may reduce or eliminate channeling problems that might otherwise arise if the liquid were allowed to continuously drip from the capture tank 62 onto the carbon filters 108.

At the end of a predetermined amount of time (such as at the end of an application cycle, a shift, a day, or any other amount of time) or at the desire of an operator of system 10, the valve 56 may be actuated to divert the dilute antimicrobial composition received from the recycle tank 42 to the capture pump 64, so as to discard the antimicrobial composition. The capture pump 64 may empty the recycle tank 42 and pass the discarded antimicrobial composition to the capture tank 62. When the liquid reaches a desired level in the capture tank 62, the siphon 102 may route the liquid through conduit 104 and to the disposable carbon filters 108 of the antimicrobial separation unit 106. The disposable filters 108 may capture the antimicrobial to selectively remove the antimicrobial from the solution. When the antimicrobial impregnated disposable filters 108 are spent, they may then be disposed of in an appropriate manner, such as by incineration or disposal at an approved landfill. The remaining, relatively antimicrobial-free liquid may then be disposed of in an appropriate manner, such as by being drained into a wastewater system of a plant. The frequency with which the antimicrobial composition may be discarded may depend upon any number of factors, such as the number of work pieces 20 to be processed by the antimicrobial application system 12 and the volume of the dilute antimicrobial composition required to charge the system 10 at the beginning of an application cycle. A periodic purge of the system 10 may typically be used. Although the discarded antimicrobial composition has been described above as being dumped (or otherwise directed) from the antimicrobial recycle system 14 into the antimicrobial capture system 15, the antimicrobial composition may be dumped (or otherwise directed) from either (or both) the antimicrobial application system 12 or the antimicrobial recycle system 14 into the antimicrobial capture system 15.

Antimicrobial Capture System

FIGS. 3A-3E illustrate another example of an antimicrobial capture system 115. The antimicrobial capture system 115 may be configured for use with any system that utilizes (or otherwise applies) an antimicrobial composition (such as the systems described above with regard to FIGS. 1-2), and may be configured to capture all or a portion of the antimicrobial component of the antimicrobial composition. For example, at the end of a predetermined amount of time (such as at the end of an application cycle, a shift, a day, or any other amount of time) or at the desire of an operator of system 10, the system 10 may be purged of remaining portions of the antimicrobial composition (e.g., the discarded portions of the antimicrobial composition). The antimicrobial capture system 115 may remove a portion of the antimicrobials from the received antimicrobial composition. The remaining portions of the discarded antimicrobial composition (which may be relatively antimicrobial-free) may then be disposed of in an appropriate manner, such as by being drained into a wastewater system of a plant.

As illustrated, the antimicrobial capture system 115 may include one or more containers 120 for removing antimicrobials from an antimicrobial composition. A container 120 may include any type of container for holding liquid, such as a drum, a tank, a cistern, a barrel, any other container, or any combination of the preceding. As illustrated, the container 120 is a drum. The container 120 may have any size. For example, the container 120 may be a container that may hold 50 gallons of liquid, 100 gallons of liquid, 200 gallons of liquid, 300 gallons of liquid, 500 gallons of liquid, or any other amount of liquid. As illustrated, the container 120 is a drum that can hold 330 gallons of liquid (e.g., a 330 gallon drum). The container 120 may also have any shape. For example, the container may be a cylinder, a cube, a rectangular prism, a triangular prism, an irregular shape, any other shape, or any combination of the preceding. The antimicrobial capture system 115 may include any number of containers 120. For example, the antimicrobial capture system 115 may include one container 120, two containers 120, three containers 120, five containers 120, ten containers 120, or any other number of containers 120. As illustrated, the antimicrobial capture system 115 includes only a single container 120. In particular embodiments, the number of containers 120 included in the antimicrobial capture system 115 may be based on the number of antimicrobial application systems 12 being used with the antimicrobial capture system 115. For example, if two antimicrobial application systems 12 are being used with the antimicrobial capture system 115, for example, the antimicrobial capture system 115 may include two containers 120 (e.g., a single container 120 for each antimicrobial application system 12).

The container 120 may include a container body 125 and a container lid 140. The container body 125 may have a container body exterior 130 and a container body interior 135. The container body interior 135 may be filled with carbon granules 145. The carbon granules 145 may be configured to remove a portion of the antimicrobials in the antimicrobial composition. For example, the carbon granules 145 may be configured to absorb (or otherwise remove) a portion of the quaternary ammonium compound, the alkylpyridinium chloride, the cetylpyridinium chloride, or any other antimicrobial from the antimicrobial composition. The carbon granules 145 may be configured to remove any portion of the antimicrobials in the antimicrobial composition. In particular embodiments, the carbon granules 145 may be configured to remove a sufficient amount of the antimicrobials from the antimicrobial composition to allow the remainder of the antimicrobial composition to be properly disposed of in, for example, a wastewater system.

The container body interior 135 may be filled with any amount of carbon granules 145. For example, the container body interior 135 may be filled with 100 pounds of carbon granules 145, 200 pounds of carbon granules 145, 300 pounds of carbon granules 145, 500 pounds of carbon granules 145, 600 pounds of carbon granules 145, 1,000 pounds of carbon granules 145, or any other amount of carbon granules 145. As another example, the container body interior 135 may be filled with approximately 100 pounds of carbon granules 145 (i.e., 100 pounds+/−10 pounds), approximately 200 pounds of carbon granules 145, approximately 300 pounds of carbon granules 145, approximately 500 pounds of carbon granules 145, approximately 600 pounds of carbon granules 145, approximately 1,000 pounds of carbon granules 145, or approximately any other amount of carbon granules 145.

In particular embodiments, the carbon granules 145 may fill the container body interior 135 to a particular fill height 150 of the container body 125. The fill height 150 of the container body 125 may be located at any portion of the height 155 of the container body 125. For example, the fill height 150 may be located at % of the height 155 of the container body 125, ⅓ of the height 155 of the container body 125, ½ of the height 155 of the container body 125, ⅔ of the height 155 of the container body 125, ¾ of the height 155 of the container body 125, or any other portion of the height 155 of the container body 125. As another example, the fill height 150 may be located at approximately ¼ of the height 155 of the container body 125 (i.e., ¼ of the height 155+/−3 inches), approximately ⅓ of the height 155 of the container body 125, approximately ½ of the height 155 of the container body 125, approximately ⅔ of the height 155 of the container body 125, approximately ¾ of the height 155 of the container body 125, or approximately any other portion of the height 155 of the container body 125.

Although the container body interior 135 has been described above as being filled with carbon granules 145 to a particular fill height 150 of the container body 125, in particular embodiments, the container body interior 135 may alternatively (or additionally) be filled with carbon granules 145 to a particular volume of the container body 125. For example, the container body interior 135 may be filled with carbon granules 145 to ¼ of the volume of the container body 125, ⅓ of the volume of the container body 125, ½ of the volume of the container body 125, ⅔ of the volume of the container body 125, ¾ of the volume of the container body 125, or any other portion of the volume of the container body 125. As another example, the container body interior 135 may be filled with carbon granules 145 to approximately ¼ of the volume of the container body 125 (i.e., ¼ of the volume+/−1/10 of the volume), approximately ⅓ of the volume of the container body 125, approximately ½ of the volume of the container body 125, approximately ⅔ of the volume of the container body 125, approximately ¾ of the volume of the container body 125, or approximately any other portion of the volume of the container body 125.

Although the container body interior 135 has been described above as being filled with carbon granules 145, in particular embodiments, the container body interior 135 may alternatively (or additionally) be filled with carbon in any other form(s), such as carbon rocks and/or carbon sheets. Furthermore, the container body interior 135 may alternatively (or additionally) be filled with any other element(s) configured to remove a portion of the antimicrobials in the antimicrobial composition.

The container body interior 135 may further be filled with a liquid 160. The liquid 160 may include any liquid that may be used in the removal of antimicrobials from the antimicrobial composition. For example, the liquid 160 may include water (such as potable water), the antimicrobial composition (such as the discarded antimicrobial composition discussed above), any other liquid that may be used in the removal of antimicrobials from the antimicrobial composition, or any combination of the preceding. The composition of the liquid 160 may change over time. For example, prior to any antimicrobial composition being added to the container 120, the liquid 160 may be entirely an initial liquid, such as water. As another example, after the antimicrobial composition is added to the container 120, the liquid 160 may be a combination of the initial liquid and the antimicrobial composition. As a further example, the percentage of the initial liquid and the antimicrobial composition in the liquid 160 may change as more of the antimicrobial composition is added to the container 120, more of the initial liquid is added to the container 120, and/or portions of the liquid 160 are removed from the container 120.

The container body interior 135 may be filled with any amount of liquid 160. For example, the container body interior 135 may be filled with 20 gallons of liquid 160, 50 gallons of liquid 160, 100 gallons of liquid 160, 120 gallons of liquid 160, 200 gallons of liquid 160, or any other amount of liquid 160. As another example, the container body interior 135 may be filled with approximately 20 gallons of liquid 160 (i.e., 20 gallons+/−10 gallons), approximately 50 gallons of liquid 160, approximately 100 gallons of liquid 160, approximately 120 gallons of liquid 160, approximately 200 gallons of liquid 160, or approximately any other amount of liquid 160. Furthermore, the amount of liquid 160 filling the container body interior 135 may change over time.

In particular embodiments, the liquid 160 may fill the container body interior 135 to at least a particular liquid level 165. The liquid level 165 may be any level that completely submerges the carbon granules 145. For example, if carbon granules 145 fill the container body interior 135 to a fill height 150 located at approximately ½ of the height 155 of the container body 124, the liquid level 165 may be any level above the approximately ½ of the height 155 of the container body 124, so as to completely submerge the carbon granules 145. In particular embodiments, the liquid 160 may completely submerge the carbon granules 145 throughout the operation of the antimicrobial capture system 115. For example, once the container 120 is set up at, for example, a food processing plant, the container 120 may be filled with the liquid 160 so as to completely submerge the carbon granules 145. In such an example, the liquid 160 may continue to completely submerge the carbon granules 145 until the carbon granules 145 are no longer removing antimicrobials from the antimicrobial composition. Then, the container 120 may be completely cleaned out (removing both the carbon granules 145 and the liquid 160), and may be re-filled with carbon granules 145 and further re-filled with liquid 160 completely submerging the carbon granules 145.

In particular embodiments, by keeping the carbon granules 145 completely submerged by the liquid 160, the useful life of the carbon granules 145 may be extended. For example, by keeping the carbon granules 145 completely submerged by the liquid 160, the carbon granules may not dry out (or the amount of drying may be reduced or at least partially prevented), which may extend the useful life of the carbon granules 145. As another example, by keeping the carbon granules 145 completely submerged by the liquid 160, channeling of the carbon granules 145 may be reduced (or at least partially prevented). In typical antimicrobial capture systems, the antimicrobial composition may be poured onto dry carbon granules. This may, in particular embodiments, cause the antimicrobial composition to form channels in the dry carbon granules which may prevent the entire dry carbon granule from being used to remove antimicrobials. That is, the typical dry carbon granules may be less effective. Contrary to this, by keeping the carbon granules 145 completely submerged by the liquid 160, the antimicrobial composition may be poured into the liquid 160, as opposed to on dry carbon granules. As such, in particular embodiments, channeling in the carbon granules 145 may be reduced (or at least partially prevented), which may increase the useful life of the carbon granules 145.

The container body interior 135 may further include an agitator 170 positioned at least partially within with the container body interior 135. The agitator 170 may be configured to agitate at least a portion of the carbon granules 145. For example, the agitator 170 may be configured to agitate at least a portion of the carbon granules 145 by producing air bubbles in the liquid 160. In such an example, these air bubbles may travel upward through the liquid 160, disrupting (or otherwise agitating) the carbon granules 145. In particular embodiments, the agitation may cause one or more (or all) of the carbon granules 145 to turn over and over. The agitator 170 may be any device configured to agitate at least a portion of the carbon granules 145. For example, the agitator 170 may be an air agitation hose, a vibrating device, an impeller, a propeller, any other device configured to agitate at least a portion of the carbon granules 145, or any combination of the preceding. As illustrated in FIGS. 3A-3E, the agitator 170 is an air agitation hose (or soaker hose) configured to receive compressed air (such as compressed air at 60 pounds per square inch, or any other pressure), and further configured to release the compressed air through one or more holes in the air agitation hose, thereby producing bubbles.

Figure 3A:
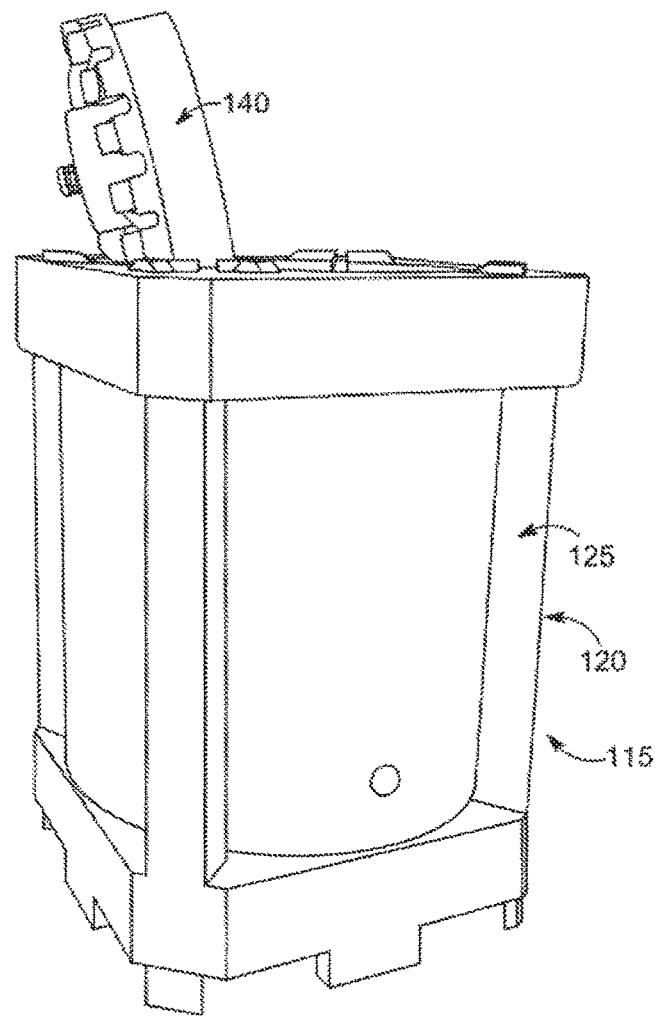
FIG. 3A is a side elevation view of an example antimicrobial capture system.
Figure 3B:
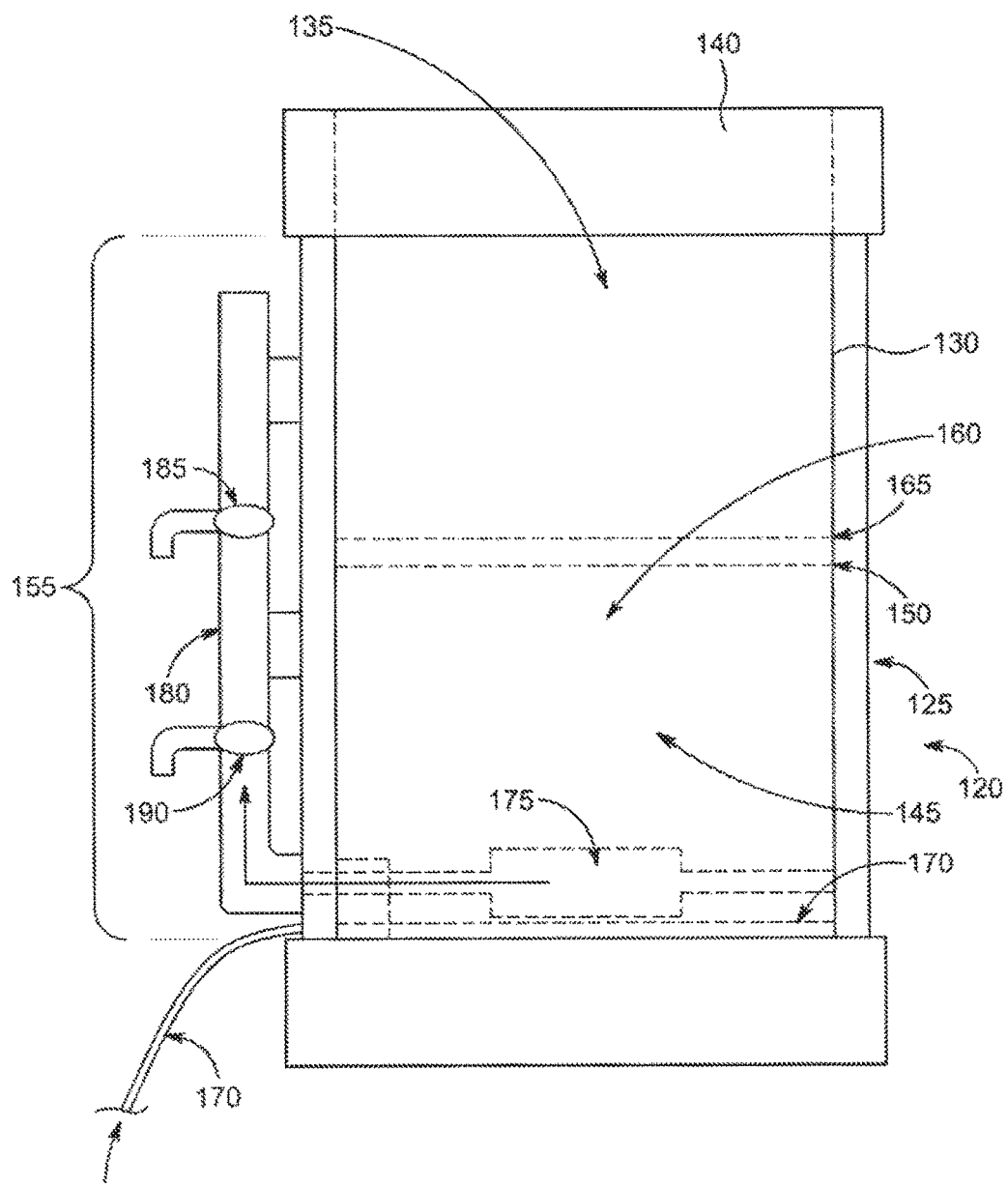
FIG. 3B is a schematic view of an example antimicrobial capture system.
Figure 3C:
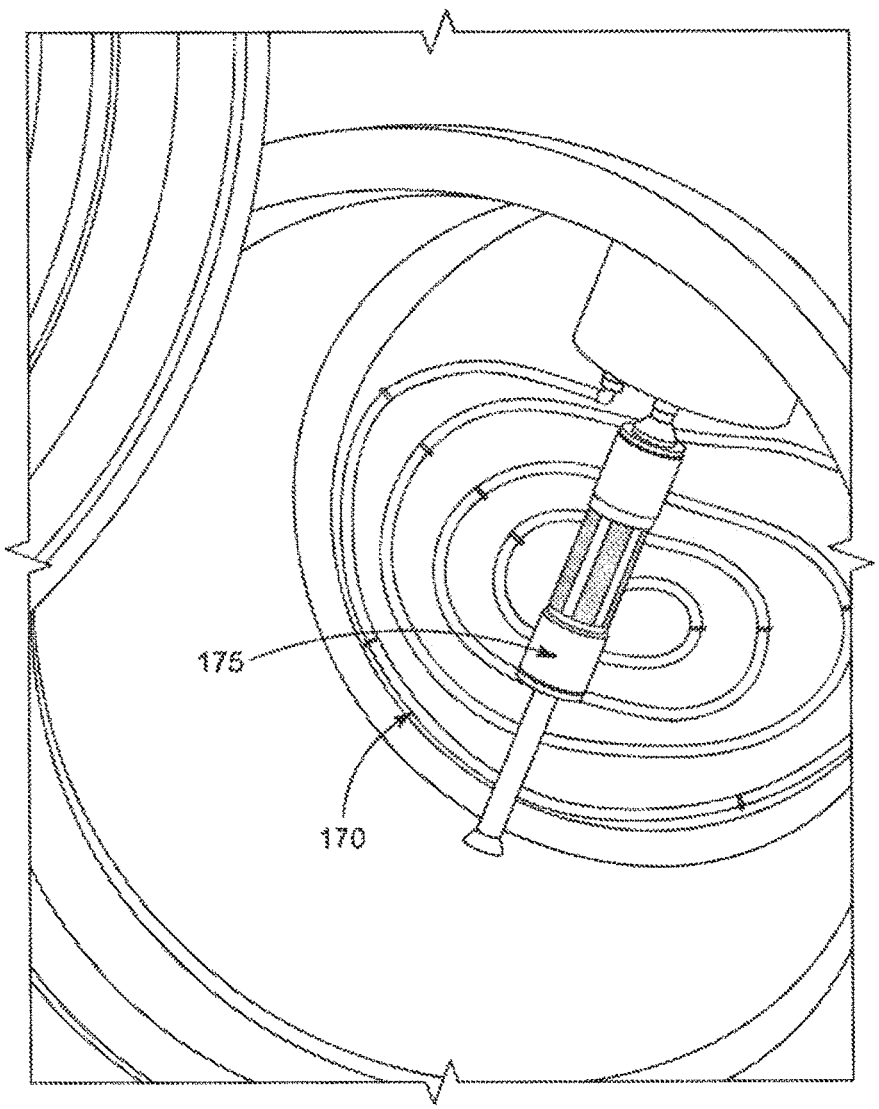
FIG. 3C is a top view of an example container body interior of an example antimicrobial capture system.

The agitator 170 may be positioned in any location within the container body interior 135 that may allow the agitator 170 to agitate at least a portion of the carbon granules 145. For example, the agitator 170 may be positioned in the bottom of the container body interior 135, at the top of the container body interior 135, on one or more sides of the container body interior 135, any other location, or any combination of the preceding. The agitator 170 may be positioned entirely within the container body interior 135. Furthermore, the agitator 170 may be positioned partially within the container body interior 135. In such an example, a portion of the agitator 170 may be positioned outside of the container 120, and may supply, for example, compressed air to the portion of the agitator positioned within the container body interior 135. The agitator 170 may be arranged in (or have) a pattern that may assist in agitating the carbon granules 145. For example, the agitator 170 may be arranged in a spiral pattern (as illustrated in FIG. 3C), a square pattern, a rectangular pattern, a circle pattern, an irregular pattern, any other pattern, or any combination of the preceding. The agitator 170 may have any size. For example, as is illustrated in FIGS. 3B-3C, the agitator 170 may be an air agitation hose with an outside diameter of 0.5 inches, 0.75 inches, 1.0 inches, 1.25 inches, 1.50 inches, 2 inches, 3 inches, or any other sized outside diameter.

The agitator 170 may agitate any portion of the carbon granules 145. For example, the agitator may agitate all of the carbon granules, ⅓ of the carbon granules 145, ½ of the carbon granules 145, ⅔ of the carbon granules 145, only the carbon granules in the bottom half of the container body interior 135, only the carbon granules in the top half of the container body interior 135, or any other portion of the carbon granules 145.

The agitator 170 may be operated manually and/or automatically. For example, the agitator 170 may be coupled to a control apparatus (e.g., a handle, a lever, a pedal, a wheel, a button, or any other manual control apparatus) that may allow an operator to manually activate the agitator 170. As another example, the agitator 170 may be coupled to a timing system (not shown) that may allow the agitator 170 to be activated automatically and/or manually. The agitator 170 may be activated at any time. For example, the agitator 170 may be activated immediately after a portion of antimicrobial composition is added to the container 120, immediately before a portion of the liquid 160 is removed from the container 120 (via the drainage valve 185, discussed below), periodically (such as every 10 minutes, every 20 minutes, every half hour, every hour, every 1.5 hours, every 2 hours, or any other time period), after a predetermined amount of time, randomly, or any combination of the preceding. The agitator 170 may be activated for any amount of time. For example, the agitator 170 may be activated for 1 minute, 2 minutes, 5 minutes, 10 minutes, 20 minutes, a half hour, an hour, 1.5 hours, 2 hours, or any other time period. As another example, the agitator 170 may be activated for at least 5 minutes, at least 10 minutes, at least 20 minutes, at least a half hour, at least an hour, or any other time period.

In particular embodiments, agitation of the carbon granules 145 may reduce (or at least partially prevent) blinding. In typical antimicrobial capture systems, biological components (such as emulsified fat from the poultry carcasses) included in the antimicrobial composition may bind to carbon granules. This binding may be referred to as blinding, and it may prevent the carbon granules from effectively removing the antimicrobial from the antimicrobial composition. Contrary to this, agitating the carbon granules 145 may reduce (or at least partially prevent) such blinding. As such, in particular embodiments, the carbon granules 145 ability to remove antimicrobials may be increased. Furthermore, in particular embodiments, agitation of the carbon granules may reduce (or at least partially prevent) channeling of the carbon granules. As such, the agitation may increase the useful life of the carbon granules 145.

The container body interior 135 may further include a drain 175 positioned within the container body interior 135. The drain 175 may be configured to drain at least a portion of the liquid 160 out of the container body interior 135. The drain 175 may be any device configured to drain at least a portion of the liquid 160 out of the container body interior 135. For example, the drain 175 may be a pipe (made from, for example, polyvinyl chloride (PVC)) having one or more perforations that allow the liquid 160 to drain into the interior of the pipe. The drain may have any size and/or shape. For example, the drain may be a pipe with an outside diameter of 0.5 inches, 0.75 inches, 1.0 inches, 1.25 inches, 1.50 inches, 2 inches, 3 inches, 4 inches, 5 inches, 6 inches, or any other sized outside diameter.

The drain 175 may be positioned in any location within the container body interior 135 that may allow the drain 175 to drain the liquid 160 from the container body interior 135. For example, the drain 175 may be positioned in the bottom of the container body interior 135, on one or more sides of the container body interior 135, any other location, or any combination of the preceding. In particular embodiments, the drain 175 may be positioned in the bottom of the container body interior 135 in a location that is vertically above the agitator 170 (such as adjacently above the agitator 170), as is illustrated in FIGS. 3B and 3C.

The container 120 may further include a stand pipe 180 coupled to the container body exterior 130 and further coupled to the drain 175. The stand pipe 180 may extend in a vertical direction along the container body exterior 130, as is illustrated in FIG. 3B. Furthermore, the stand pipe 180 may be configured to receive the liquid 160 from the drain 175, and redirect the liquid 160 in the vertical direction along the container body exterior 130. The stand pipe 180 may be formed from any material, may have any shape, and/or may have any size. The stand pipe 180 may extend in the vertical direction along the container body exterior 130 in any manner. For example, the stand pipe 180 may be a straight pipe that extends only (or primarily) in the vertical direction, an angled pipe that may extend in a horizontal direction (in addition to the vertical direction), or any combination of the preceding.

The container 120 may further include a drainage valve 185 coupled to the stand pipe 180. The drainage valve 185 may be configured to drain the liquid 160 received in the stand pipe 180. For example, as is discussed above, the stand pipe 180 may receive the liquid 160 from the drain 175 and redirect the liquid 160 in the vertical direction along the container body exterior 130. In such an example, the drainage valve 185 may be configured to drain this liquid 160 received and redirected in the vertical direction by the stand pipe 180. Furthermore, the drainage performed by the drainage valve 185 may result in the drainage of the liquid 160 in the container body interior 135. For example, as the drainage valve 185 drains the liquid 160 received by the stand pipe 180, the stand pipe 180 may be able to receive additional liquid 160 from the drain 175, which may be able to drain (or otherwise receive) additional liquid 160 from the container body interior 135. The drainage valve 185 may be any type of valve that may allow and/or prevent the flow of liquid 160 past the drainage valve 185, thereby allowing and/or preventing drainage of the liquid 160. Furthermore, the drainage valve 185 may be connected to a spigot (or any other drainage apparatus) that may allow the liquid 160 to flow out of (or otherwise be drained from) the antimicrobial capture system 115. This spigot (or any other drainage apparatus) may be connected to a waste disposal area (such as a wastewater system in the food processing plant) that may dispose of the liquid 160 drained from the antimicrobial capture system 115.

The drainage valve 185 may be located at any position with regard to the container body 125 that may allow the drainage valve 185 to drain the liquid 160. For example, the drainage valve 185 may be coupled to the stand pipe 180 (and thus located) at a position that is at the bottom of the container body 125, a position that is at the top of the container body 125, a position that is at half of the height 155 of the container body 125, or any other position. As another example, the drainage valve 185 may be coupled to the stand pipe 180 (and thus located) at a position that is at approximately the bottom of the container body 125 (i.e., the bottom of the container body 125+/−2 inches), a position that is at approximately the top of the container body 125, a position that is at approximately half of the height 155 of the container body 125, or at approximately any other position. As a further example, the drainage valve 185 may be coupled to the stand pipe 185 (and thus located) at a position that is vertically above the fill height 150 of the container body 125. As is discussed above, the fill height 150 may refer to the height to which the carbon granules 145 may fill the container body interior 135. As such, in particular embodiments, the drainage valve 185 may be coupled to the stand pipe 185 (and thus located) at a position that is vertically above all of the carbon granules 145 positioned within the container body interior 135. In particular embodiments, this position may be configured to prevent the drainage valve 185 from lowering a current level of the liquid 160 in the container body interior 135 below the fill height 150. That is, in particular embodiments, this position may be configured to prevent the drainage valve 185 from lowering a current level of the liquid 160 in the container body interior 135 below the carbon granules 145 filling the container body interior 135. Therefore, the carbon granules 145 may remain submerged by the liquid 160. As a further example, the drainage valve 185 may be coupled to the stand pipe 185 (and thus located) at the liquid level 165. As is discussed above, the liquid level 165 may be any level of the liquid 160 that completely submerges the carbon granules 145. In particular embodiments, this position may be configured to prevent the drainage valve 185 from lowering a current level of the liquid 160 in the container 135 below the liquid level 165. Therefore, the carbon granules 140 may remain submerged by the liquid 160.

The drainage valve 185 may be operated (opened and/or closed) manually and/or automatically. For example, the drainage valve 185 may be coupled to a control apparatus (e.g., a handle, a lever, a pedal, a wheel, a button, or any other manual control apparatus) that may allow an operator to manually open (and/or close) the drainage valve 185, causing the liquid 160 to flow out of a spigot (or any other drainage apparatus) connected to the drainage valve 185. In such an example, the drainage valve 185 may be manually opened when it has been determined (such as via testing) that the concentration of the antimicrobials in the liquid 160 is at or below a predetermined amount (such as at or below an amount of antimicrobials at which the liquid 160 may be dumped into a wastewater system). Furthermore, the drainage valve 185 may be manually closed when it has been determined (such as via testing) that the concentration of the antimicrobials in the liquid 160 is above a predetermined amount (such as above an amount of antimicrobials at which the liquid 160 may be dumped into a wastewater system). As another example, the drainage valve 185 may be coupled to a timing system (not shown) that may allow the drainage valve 185 to be operated automatically and/or manually.

The drainage valve 185 may be operated at any time. For example, the drainage valve 185 may be closed for a predetermined amount of time after any portion of the antimicrobial composition is added to the container 120. This predetermined amount of time may be any amount of time, such as, for example, 10 minutes, 20 minutes, a half hour, an hour, 1.5 hours, 2 hours, 3 hours, 6 hours, a half day, a day, 2 days, 3 days, a week, or any other amount of time. In particular embodiments, this may prevent the drainage valve 185 from draining any of the liquid 160 within the predetermined amount of time after a most recent portion of the antimicrobial composition is added to the container 120. As such, if the predetermined amount of time is 1 hour, the drainage valve 185 may be prevented (by the timing system, for example) from draining any of the liquid 160 within the 1 hour after the most recent portion of the antimicrobial composition is added to the container 120. In particular embodiments, the predetermined amount of time for which the drainage valve 185 is closed may be based on the concentration of antimicrobials in the liquid 160. For example, the predetermined amount of time for which the drainage valve 185 is closed may be selected as an amount of time it may take the carbon granules 145 to remove enough antimicrobials to drop the concentration of antimicrobials in the liquid 160 below a predetermined amount (such as a concentration amount of antimicrobials at which the liquid 160 may be dumped into a wastewater system). Furthermore, once the drainage valve 185 has been opened, the drainage valve 185 may remain open for a predetermined amount of time. For example, the drainage valve 185 may remain open for 1 minute, 2 minutes, 5 minutes, 10 minutes, 15 minutes, 20 minutes, 25 minutes, 30 minutes, 35 minutes, 40 minutes 45 minutes, 50 minutes, 55 minutes, an hour, 1.5 hours, 2 hours, or any other time period.

As another example, the drainage valve 185 may be closed and opened in accordance with a particular schedule. This schedule may be any schedule, such as closed for 1 hour and open for 10 minutes, closed for 1.5 hours and open for 10 minutes, closed for 2 hours and open for 10 minutes, closed for 3 hours and open for 10 minutes, closed for 1 hour and open for 15 minutes, closed for 1.5 hours and open for 15 minutes, closed for 2 hours and open for 15 minutes, closed for 3 hours and open for 15 minutes, closed for 1 hour and open for 20 minutes, closed for 1.5 hours and open for 20 minutes, closed for 2 hours and open for 20 minutes, closed for 3 hours and open for 20 minutes, closed for at least 1 hour and open for less than 30 minutes, closed for at least 1.5 hours and open for less than 30 minutes, closed for at least 2 hours and open for less than 30 minutes, closed for at least 1 hour and open for less than 20 minutes, closed for at least 1.5 hours and open for less than 20 minutes, closed for at least 2 hours and open for less than 20 minutes, closed for at least 1 hour and open for less than 15 minutes, closed for at least 1.5 hours and open for less than 15 minutes, closed for at least 2 hours and open for less than 15 minutes, or any other schedule.

As a further example, the drainage valve 185 may be closed and/or opened in accordance with monitoring of the concentration of antimicrobials in the liquid 160. In such an example, one or more sensors may be located within the container body interior 135 (or at any other location) to monitor the concentration of antimicrobials in the liquid 160. When the monitoring indicates that the level of antimicrobials is at or below a predetermined amount (such as at or below an amount of antimicrobials at which the liquid 160 may be dumped into a wastewater system), the drainage valve 185 may be opened so as to drain the liquid 160. Furthermore, when the monitoring indicates that the level of antimicrobials is above a predetermined amount (such as above an amount of antimicrobials at which the liquid 160 may be dumped into a wastewater system), the drainage valve 185 may be closed so as to prevent drainage of the liquid 160. As another example, the drainage valve 185 may be closed and/or opened at random.

Although the container 120 has been described above as including drain 175, stand pipe 180, and drainage valve 185 for draining liquid 160, in particular embodiments, a valve and spigot may alternatively (or additionally) be coupled directly to one or more sides of the container body 125 for draining liquid 160 directly from the container body 125. In such embodiments, the valve and spigot may be coupled to the side of the container body 125 (and thus located) at a position that is at the bottom of the container body 125, a position that is at the top of the container body 125, a position that is at half of the height 155 of the container body 125, or any other position. As a further example, the valve and spigot may be coupled to the side of the container body 125 (and thus located) at a position that is vertically above the fill height 150 of the container body 125. In particular embodiments, this position may be configured to prevent the valve and spigot from lowering a current level of the liquid 160 in the container body interior 135 below the carbon granules 145 filling the container body interior 135. Therefore, the carbon granules 145 may remain submerged by the liquid 160. As a further example, the valve and spigot may be coupled to the side of the container body 125 (and thus located) at the liquid level 165. In particular embodiments, this position may be configured to prevent the drainage valve 185 from lowering a current level of the liquid 160 in the container body 125 below the liquid level 165. Therefore, the carbon granules 140 may remain submerged by the liquid 160.

The container 120 may further include a sample valve 190 coupled to the stand pipe 180. The sample valve 190 may be configured to provide a sample of the liquid 160 for testing of the concentration of the antimicrobials in the liquid 160. For example, as is discussed above, the stand pipe 180 may receive the liquid 160 from the drain 175, and redirect the liquid 160 in the vertical direction along the container body exterior 130. In such an example, the sample valve 190 may be configured to drain a portion of this liquid 160 received and redirected in the vertical direction by the stand pipe. This portion of the liquid 160 may be used to test the concentration of the antimicrobials in the liquid 160. For example, this portion of the liquid 160 may be used to test the concentration of the remaining antimicrobials in the liquid 160 (e.g., the concentration of the antimicrobials that have not been removed from the antimicrobial composition by the carbon granules 145). The sample valve 190 may be any type of valve that may allow and/or prevent the flow of liquid 160 past the sample valve 190, thereby allowing and/or preventing drainage of the liquid 160. Furthermore, the sample valve 190 may be connected to a spigot (or any other drainage apparatus) that may allow the liquid 160 to flow out of (or otherwise be drained from) the antimicrobial capture system 115. An operator of the antimicrobial capture system 115 may collect the sample of the liquid 160 using the sample valve 190, and may test the liquid 160 (or cause the liquid 160 to be tested). In particular embodiments, the sample valve 190 may be coupled to one or more sensors that may automatically test the liquid 160.

The sample valve 190 may be configured to provide any amount of the liquid 160 for testing. For example, the sample valve 190 may provide one or more drops of the liquid 160, a teaspoon of the liquid 160, a tablespoon of the liquid 160, a cup of the liquid 160, a liter of the liquid 160, a gallon of the liquid 160, or any other amount of the liquid 160. The sample valve 190 may be located at any position with regard to the container body 125 that may allow the sample valve 190 to provide a sample of the liquid 160. For example, the sample valve 190 may be coupled to the stand pipe 180 (and thus located) at a position that is at the bottom of the container body 125, a position that is at the top of the container body 125, a position that is at ½ of the height 155 of the container body 125, a position that is at ¼ of the height 155 of the container body 125, or any other position. As another example, the sample valve 190 may be coupled to the stand pipe 180 (and thus located) at a position that is at approximately the bottom of the container body 125 (i.e., the bottom of the container body 125+/−2 inches), a position that is at approximately the top of the container body 125, a position that is at approximately ½ of the height 155 of the container body 125, a position that is at approximately ¼ of the height 155 of the container body 125, or at approximately any other position. As another example, the sample valve 190 may be coupled to the stand pipe 180 (and thus located) at a position that is vertically below the drainage valve 185. In such an example, if the drainage valve 185 is coupled to the stand pipe 180 (and thus located) at a position that is vertically above approximately ½ of the height 155 of the container body 125, the sample valve 190 may be coupled to the stand pipe 180 at any position that is at or vertically below the approximately ½ of the height 155 of the container body 125 (such as at a position that is at approximately ¼ of the height 155 of the container body 125).

The sample valve 190 may be operated (opened and/or closed) manually and/or automatically. For example, the sample valve 190 may be coupled to a control apparatus (e.g., a handle, a lever, a pedal, a wheel, a button, or any other manual control apparatus) that may allow an operator to manually open (and/or close) the sample valve 190, causing the liquid 160 to flow out of a spigot (or any other drainage apparatus) connected to the sample valve 190. In such an example, the sample valve 190 may be manually opened at any time testing of the liquid 160 is desired. As another example, the sample valve 190 may be coupled to a timing system (not shown) that may allow the sample valve 190 to be operated automatically and/or manually. The sample valve 190 may be operated at any time. For example, the sample valve 190 may be operated (e.g., opened to provide a sample) at a predetermined amount after any portion of the antimicrobial composition is added to the container 120. This predetermined amount of time may be any amount of time, such as, for example, 10 minutes, 20 minutes, a half hour, an hour, 1.5 hours, 2 hours, 3 hours, 6 hours, a half day, a day, 2 days, 3 days, a week, or any other amount of time. As another example, the sample valve 190 may be operated (e.g., opened to provide a sample) at a predetermined amount of time before any liquid 160 is scheduled to be drained from the container 120. This predetermined amount of time may be any amount of time, such as, for example, 5 minutes, 10 minutes, 20 minutes, a half hour, an hour, 1.5 hours, 2 hours, 3 hours, 6 hours, a half day, a day, 2 days, 3 days, a week, or any other amount of time before any liquid 160 is scheduled to be drained from the container 120. In particular embodiments, this may allow the liquid 160 to be tested prior to a scheduled drainage of the liquid 160. If the liquid 160 does not pass the test, the scheduled drainage of the liquid 160 may be postponed or rescheduled. As a further example, the sample valve 190 may be operated (e.g., opened to provide a sample) in accordance with a particular schedule. This particular schedule may be any schedule, such as opened for a sample every 1 hour, every 1.5 hours, every 2 hours, every 2.5 hours, every 3 hours, every 6 hours, every half of a day, every day, or any other amount of time.

The container 120 may further include a container lid 140 coupled to the drum body 125. The container lid 140 may be configured to seal the container 120. For example, the container lid 140 may be configured to seal the container 120 so as to prevent liquid 160 and/or carbon granules 145 from exiting (or being removed from) the container 120 through the top of the container 120. The container lid 140 may be any type of lid, may have any shape, and/or may have any size for sealing the container 120. The container lid 140 may be coupled to the drum body 125 in any manner. For example, the container lid 140 may be coupled to the drum body 125 using one or more hinges (which may allow the container lid 140 to swing open and/or shut), one or more fasteners (e.g., nails, screws), one or more adhesives, one or more clips, any other manner of coupling the container lid 140 to the drum body 125, or any combination of the preceding. The container lid 140 may be removably coupled to the drum body 125. For example, although the container lid 140 may seal the container 120, the container lid 140 may further be detached from the container body 125 (e.g., a pin in the hinge coupling the container lid 140 to the container body 125 may be removed so as to detach the container lid 140 from the container body 125). In particular embodiments, this may allow a different lid (or top) to be coupled to the container body 125. For example, prior to shipping the container 120 to a different location (e.g., to be filled with new carbon granules 145), a shipping lid may be coupled to the container body 125 to seal the container 120 for shipment.

Figure 3D:
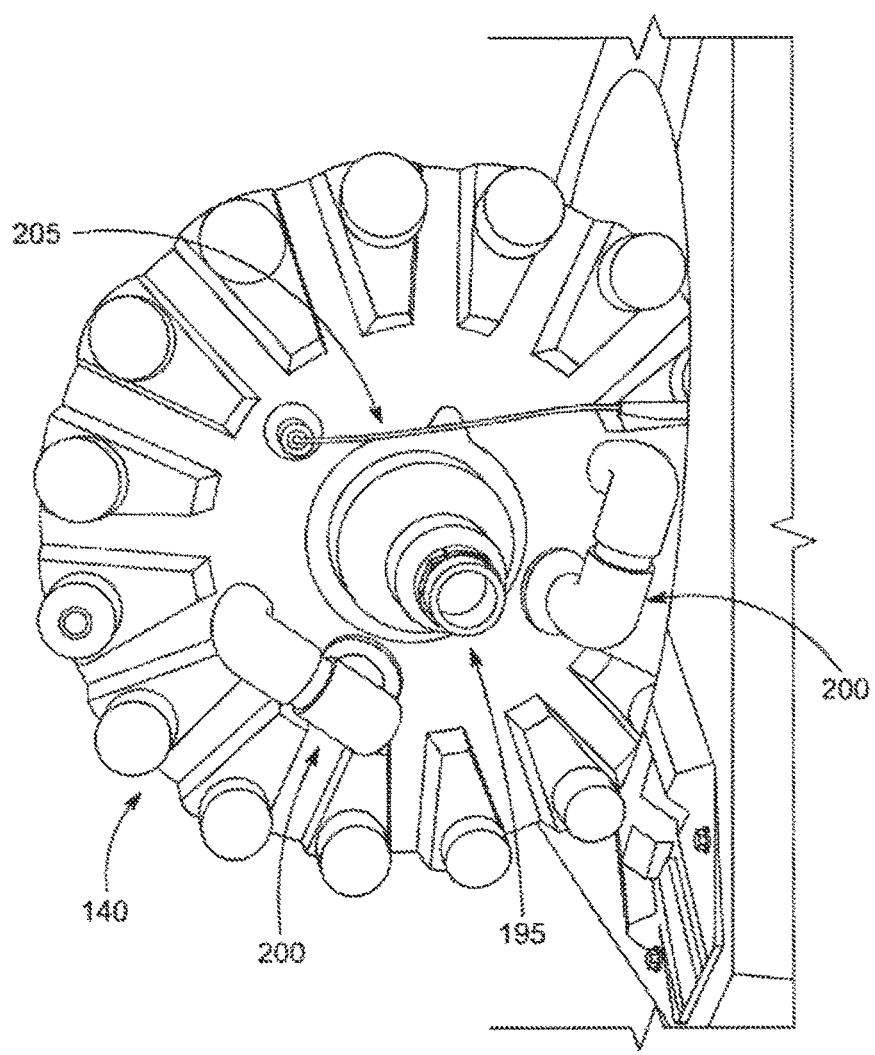
FIG. 3D is a top view of an example container lid of an example antimicrobial capture system.
Figure 3E:
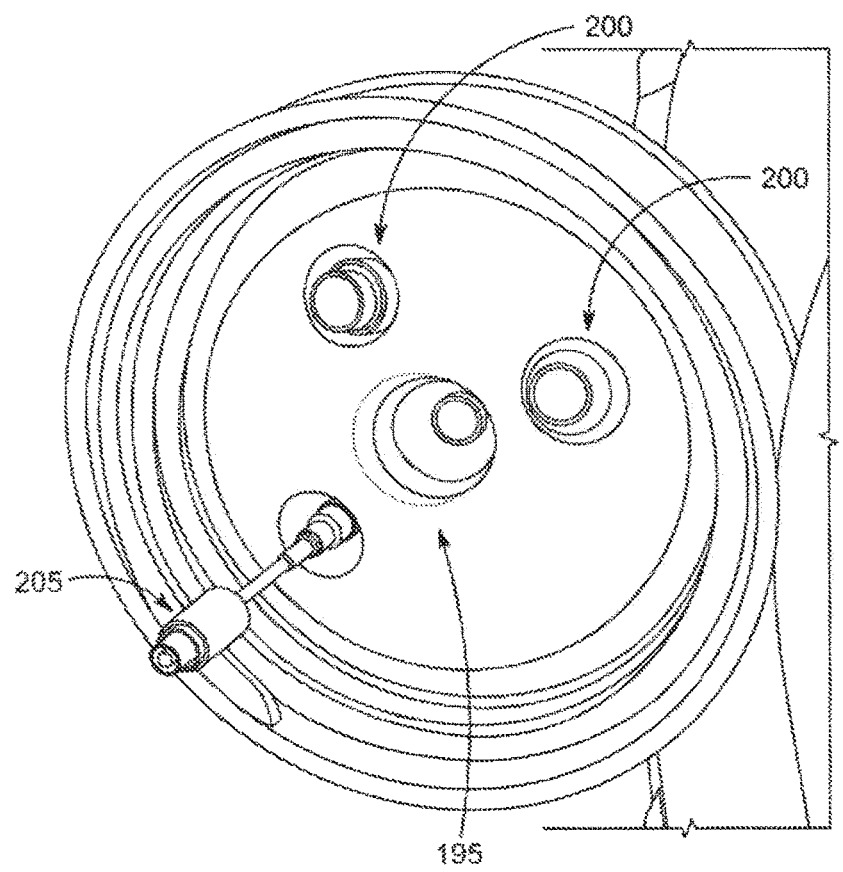
FIG. 3E is a bottom view of an example container lid of an example antimicrobial capture system.

The container lid 140 may include one or more inlets 195 (an example of which is illustrated in FIGS. 3D and 3E) for receiving the antimicrobial composition. An inlet 195 may be any type of opening in the container lid 140 that may allow the antimicrobial composition to be received into the container body interior 135. For example, the inlet 195 may be a hole extending through the container lid 140, a pipe extending through the container lid 140, a fitting (such as a quick connect fitting for a hose, for example) that extends through the container lid 140, any other type of opening in the container lid 140, or any combination of the preceding. As illustrated in FIGS. 3D and 3E, the inlet 195 may be a quick connect fitting that may allow the antimicrobial composition to be received into the container body interior 135. A supply line (such as wan inlet hose) may be connected (or otherwise coupled) to the quick connect fitting, and the antimicrobial composition may be pumped (or otherwise flow) through the quick connect fitting and into the container body interior 135. In such an example, the supply line may be configured to direct the antimicrobial composition into the container body interior 135 through the inlet 195. An example of a supply line may include (or be coupled to) the capture line 60 and/or the drain line 104 of FIG. 1. The inlet 195 may have any size and/or shape. For example, the inlet 195 may be sized to be coupled to a supply line with a 1 inch outer diameter, a 2 inch outer diameter, a 3 inch outer diameter, or any other sized outer diameter. Furthermore, the container lid 140 may include any number of inlets 195, such as one inlet 195, two inlets 195, three inlets 195, five inlets 195, or any other number of inlets 195.

The container lid 140 may include one or more vents 200 (an example of which is illustrated in FIGS. 3D and 3E) positioned in the container lid 140. A vent 200 may be configured to vent air (or any other gas) from the container body interior 135. In particular embodiments, the vent 200 may reduce (or at least partially prevent) swelling of the container 120, and may further allow for air displacement when antimicrobial composition is being added to the container 120. The vent 200 may further be configured to allow air (or any other gas) to enter the container body interior 135. The vent 200 may be any type of opening in the container lid 140 that may allow air (or any other gas) to exit and/or enter the container body interior 135. For example, the inlet 195 may be a hole extending through the container lid 140, a pipe extending through the container lid 140, any other type of opening in the container lid 140, or any combination of the preceding. As illustrated in FIGS. 3D and 3E, the vent 200 may be a pipe that extends through the container lid 140. The vent 200 may have any size and/or shape. For example, the vent 200 may have a 0.5 inch diameter, a 1 inch diameter, a 1.5 inch diameter, a 2 inch diameter, a 3 inch diameter, or any other sized diameter. As another example, the vent 200 may be shaped to direct the air through the container lid 140, and then redirect the air downward towards the top of the container lid 140, as is illustrated in FIG. 3D. The container lid 140 may include any number of vents 200, such as one vent 200, two vents 200, three vents 200, five vents 200, at least one vent 200, at least two vents 200, at least three vents 200, less than five vents 200, less than three vents 200, or any other number of vents 200.

The container lid may 140 may further include one or more liquid level sensors 205 (an example of which is illustrated in FIGS. 3D and 3E) coupled to the container lid 140. A liquid level sensor 205 may be configured to sense the current level of the liquid 160 within the container body interior 135. The liquid level sensor 205 may include any type of sensor that may sense a current level of the liquid 160, such as a float valve, a magnetic reed switch-based float, a solid-state electro-optical liquid level sensor, a conductivity-based liquid level sensor, a capacitive liquid level sensor, an ultrasonic liquid level sensor, a piezo-resonant liquid level sensor, any other type of sensor that may sense a current level of the liquid 160, or any combination of the preceding. The liquid level sensor 205 may be positioned entirely within the container body interior 135. Furthermore, the liquid level sensor 205 may be positioned partially within the container body interior 135. In such an example, a portion of the liquid level sensor 205 may be positioned outside of the container 120, and may supply power and/or communicate signals to and from the portion of the liquid level sensor 205 positioned within the container body interior 135.

The liquid level sensor 205 may also be configured to provide (or transmit) a signal with regard to the sensed current level of the liquid 160. For example, the liquid level sensor 205 may be configured to provide a continuous or periodical signal (e.g., every 10 minutes) indicating the current level of the liquid 160 (e.g., the signal may indicate that the liquid 160 is at 66% of the height 155 of the container body 125). As another example, the liquid level sensor 205 may be configured to provide a warning signal when the current level of the liquid 160 within the container body interior 135 exceeds (or is at) a predetermined level. The predetermined level may be any level of the liquid 160. For example, the predetermined level may be a level that causes the liquid to be at 60% of the height 155 of the container body 125, 70% of the height 155 of the container body 125, 80% of the height 155 of the container body 125, 95% of the height 155 of the container body 125, 99% of the height 155 of the container body 125, or any other portion of the height 155 of the container body 125. As another example, the predetermined level may be a level that cause the container body interior 135 to be 60% full, 70% full, 80% full, 90% full, 95% full, 99% full, or any other percentage (or portion) regarding capacity. The warning signal may be audible and/or visual. Additionally, the warning signal may prevent any additional liquid (such as anti-microbial composition) from being added to the container 120 until the warning signal is stopped (such as by draining a portion of the liquid 160). For example, the warning signal may automatically close off the inlet 195 until the warning signal is stopped. The warning signal may also automatically cause drainage of the liquid 160. For example, the warning signal may automatically open the drainage valve 185, causing the liquid 160 to drain until the warning signal is stopped.

Example Operation of the Antimicrobial Capture System

In an example embodiment of operation, it may be desirable to remove antimicrobials from an antimicrobial composition, such as the antimicrobial composition discussed above with regard to FIGS. 1-3. For example, it may be desirable to remove antimicrobials from an antimicrobial composition used in food processing, such as an antimicrobial composition applied to poultry carcasses. In order to do so, a container may be received. The container may be any container configured to remove antimicrobials from an antimicrobial composition, such as container 120 discussed above. The container 120 may be received in any manner. For example, the container 120 may be received by purchasing the container 120, building the container 120, forming the container 120, receiving a shipment of the container 120, accessing the container 120, moving the container 120, or any other manner of receiving the container 120. The container 120 may be received by any entity. For example, the container 120 may be received by an entity that desires to remove antimicrobials from an antimicrobial composition. In such an example, the entity may be, for example, a food processing plant that may be applying the antimicrobial composition to one or more food items, such as poultry carcasses. The container 120 may be received in any form. For example, the container 120 may be received already having one or more (or all) of the elements described above, such as, for example, the container lid 140, the carbon granules 145, the agitator 170, the drain 175, the stand pipe 180, the drainage valve 185, and/or the sample valve 190. As another example, the container 120 may not already include one or more (or all) of the elements described above. In such an example, one or more of the elements may be added to the container 120 after the container 120 is received, such as, for example, the container lid 140, the carbon granules 145, the agitator 170, the drain 175, the stand pipe 180, the drainage valve 185, and/or the sample valve 190.

Following reception of the container 120, the container body interior 135 may be filled with an initial liquid. The initial liquid may be any type of liquid that may be used in the removal of antimicrobials from an antimicrobial composition. For example, the initial liquid may be water, such as potable water. In particular embodiments, the initial liquid may be all, a portion, or none of the liquid 160. Furthermore, the amount of initial liquid in the liquid 160 may change over time. The container body interior 135 may be filled with the initial liquid in any manner. For example, a hose (or any other liquid supply conduit) may be inserted into the container body interior 135, and the container body interior 135 may be filled with the initial liquid using the hose. As another example, a hose (or any other liquid supply conduit) may be coupled to an inlet 195 positioned in the container lid 140, and the container body interior 135 may be filled with the initial liquid through the inlet 195. The container body interior 135 may be filled with any amount of the initial liquid. For example, the container body interior 135 may be filled with an initial liquid to at least a level (such as liquid level 165) that completely submerges each of the carbon granules 145 within the container body interior 135. In particular embodiments, this may extend the useful life of the carbon granules 145 by, for example, reducing (or at least partially preventing) the carbon granules 145 from drying out and/or reducing (or at least partially preventing) channeling of the carbon granules 145, as is discussed above. Although the container body interior 135 may be filled with the initial liquid following reception of the container 120, the container body interior 120 may be filled with all (or a portion) of the initial liquid prior to (or at the same time as) the reception of the container 120. For example, the container 120 may be filled with the initial liquid by, for example, a carbon granule seller, and then shipped to another entity, such as, for example, a food processing plant, for reception by the entity.

Following the filling of the container body interior 135 with the initial liquid, an antimicrobial composition may be added to the container body interior 135. The antimicrobial composition may include one or more antimicrobials. An antimicrobial may be any type of antimicrobial for treating (or otherwise being applied to) work pieces 20 (such as, for example, poultry carcasses). For example, the antimicrobial may be a quaternary ammonium compound, an alkylpyridinium chloride, a cetylpyridinium chloride, any other antimicrobial for treating (or otherwise being applied to) work pieces 20, or any combination of the preceding. In particular embodiments, the antimicrobial composition may be all, a portion, or none of the liquid 160. Furthermore, the amount of antimicrobial composition in the liquid 160 may change over time.

The antimicrobial composition may be added to the container body interior 135 in any manner. For example, a hose (or any other liquid supply device) may be coupled to an inlet 195 positioned in the container lid 140, and the antimicrobial composition may be added to the container body interior 135 through the inlet 195 using the hose. The antimicrobial composition may be received in the container body interior 135 in any manner from any source of antimicrobial composition. For example, the antimicrobial composition may be received from an antimicrobial application system 12 and/or an antimicrobial recycle system 14, as is discussed above with regard to FIGS. 1-2. In such an example, the antimicrobial composition may be discarded portions of the antimicrobial composition that may be dumped from one or more of the antimicrobial application system 12 or the antimicrobial recycle system 14 after a period of time, such as at the end of the day. In particular embodiments, the antimicrobial composition may include (or carry) biological components of the work pieces 20 being treated with the antimicrobial composition. For example, the antimicrobial composition may include (or carry) liquefied fat (or other portions of effluent) from poultry carcasses to which the antimicrobial composition has been applied. In particular embodiments, the antimicrobial composition added to the container body interior 135 may have a particular temperature. For example, the antimicrobial composition may be at least 55 degrees Celsius or at least approximately 55 degrees Celsius (i.e., 55 degrees Celsius+/−5 degrees Celsius). In particular embodiments, such a temperature of the antimicrobial composition may prevent the biological components (such as, for example, chicken poultry fat) in the discarded antimicrobial composition from solidifying, which could hinder the removal of the antimicrobials from the antimicrobial composition. In particular embodiments, the system 10 of FIG. 1 (or any other system that includes or is coupled to the antimicrobial capture system 115) may include one or more heaters to heat the temperature of the antimicrobial composition to at least 55 degrees Celsius or at least approximately 55 degrees Celsius. In particular embodiments, the room temperature in which the system 10 of FIG. 1 (or any other system) is operating (or in which a portion of the system 10 or a portion of any other system is operating) may be kept at a temperature that may allow the temperature of the antimicrobial composition to be at least 55 degrees Celsius or at least approximately 55 degrees Celsius.

The antimicrobial composition added to the container body interior 135 may include any amount of antimicrobial composition. For example, the amount of antimicrobial composition added to the container body interior 135 may include all or a portion of the antimicrobial composition dumped from the antimicrobial application system 12 and/or the antimicrobial recycle system 14. In particular embodiments, the amount of antimicrobial composition added to the container body interior 135 may be an amount that causes the liquid 160 to be at 60% of the height 155 of the container body 125, 70% of the height 155 of the container body 125, 80% of the height 155 of the container body 125, 95% of the height 155 of the container body 125, 99% of the height 155 of the container body 125, or any other portion of the height 155 of the container body 125. In particular embodiments, the amount of antimicrobial composition added to the container body interior 135 may be an amount that causes the container body interior 135 to be 60% full, 70% full, 80% full, 90% full, 95% full, 99% full, or any other percentage (or portion) regarding capacity. In particular embodiments, liquid level sensor 205 may sense a current level of the liquid 160, and may provide (or transmit) a signal with regard to the sensed current level of the liquid 160, such as a warning signal when the current level of the liquid 160 within the container body interior 135 exceeds (or is at) a predetermined level. Such a warning signal may prevent additional antimicrobial composition from being added to the container body interior 135 and/or cause drainage of the liquid 160 from the container body interior 135.

The antimicrobial composition may be added to the container body interior 135 at any time. For example, the antimicrobial composition may be added to the container body interior 135 randomly, periodically, and/or continuously. As another example, the antimicrobial composition may be added to the container body interior 135 whenever desired. The antimicrobial composition may be added at the end (and/or beginning) of a predetermined amount of time. The predetermined amount of time may be any amount of time. For example, the predetermined amount of time may be 10 minutes, 20 minutes, a half hour, an hour, 1.5 hours, 2 hours, 3 hours, 6 hours, 8 hours, a half day, a day, 2 days, 3 days, a week, or any other amount of time. As another example, the predetermined amount of time may be the beginning of a work shift, the end of a work shift, the middle of a work shift, the beginning of a day, the end of the day, the middle of the day, or any other amount of time. Although the antimicrobial composition has been described above as being added to the container body 125 following the filling of the container body interior 135 with the initial liquid, all or a portion of the antimicrobial composition may be added to the container body interior 135 prior to (or at the same time as) the filling of the container body interior 135 with the initial liquid. For example, a portion of antimicrobial composition may be included in the initial liquid.

Following the addition of the antimicrobial composition to the container body interior 135, at least a portion of the plurality of carbon granules 145 may be agitated. The carbon granules 145 may be agitated in any manner. For example, the carbon granules 145 may be agitated using the agitator 170. In such an example, the agitator 170 may be activated in order to agitate the carbon granules 145, such as by producing air bubbles in the liquid 160 in order to agitate the carbon granules 145. In particular embodiments, this may reduce (or at least partially prevent) blinding and/or reduce (or at least partially prevent) channeling of the carbon granules 145, as is discussed above. The carbon granules 145 may be agitated at any time, and for any amount of time, as is discussed above with regard to FIG. 3. For example, the carbon granules 145 may be agitated for approximately 10 minutes after the antimicrobial composition is added to the container body interior 135, and/or the carbon granules 145 may be agitated for approximately 10 minutes prior to a portion of the liquid 160 being drained from the container 120 through the drainage valve 185. Although the carbon granules 145 have been described above as being agitated following the addition of the antimicrobial composition to the container body interior 135, the carbon granules 145 may be agitated prior to (or at the same time as) the addition of the antimicrobial composition into the container body interior 135. For example, the carbon granules 145 may be agitated while antimicrobial composition is being added into the container body interior 135.

Following the addition of the antimicrobial composition to the container body interior 135, a portion of the liquid 160 may be drained from the container body interior 135. The portion of the liquid 160 may be drained from the container body interior 135 in any manner. For example, a portion of the liquid 160 may be drained from the container body interior 135 using the drainage valve 185. In particular embodiments, the liquid 160 may be drained from the container body interior 135 because the concentration of the antimicrobials in the liquid 160 is at or below a predetermined amount (such as at or below an amount of antimicrobials at which the liquid 160 may be dumped into a wastewater system). As a result, the liquid 160 may not need to be disposed of in a special manner. Instead, the liquid 160 may be disposed of, in particular embodiments, directly into the wastewater system of a plant, which may reduce the costs associated with disposal of the liquid 160. The liquid 160 may be drained from the container body interior 135 at any time, and for any period of time, as is discussed above with regard to FIG. 3. In particular embodiments, although a portion of the liquid 160 may be drained from the container body interior 135, a current level of the liquid 160 may remain at least at a level that completely submerges each of the carbon granules 145. As such, the carbon granules 145 may remain submerged in the liquid 160 throughout operation of the antimicrobial capture system 115, in particular embodiments.

In particular embodiments, prior to the portion of the liquid 160 being drained from the container body interior 135 using, for example, the drainage valve 185, a sample portion of the liquid 160 may be drained from the container body interior 135 for testing of the concentration of the remaining antimicrobials in the liquid 160, as is discussed above with regard to FIG. 3. This may allow an operator of the container 120 to determine whether it is proper to drain the liquid 160 from the container body interior 135. Furthermore, this may further allow an operator of the container 120 to determine whether the carbon granules 145 are still removing antimicrobials from the antimicrobial composition. For example, if the antimicrobial composition has been submerging the carbon granules 145 for a predetermined amount of time (such as, for example 2 hours) and the composition of antimicrobials in the liquid 160 is still too high, it may be determined (based on a test of the sample portion of liquid 160) that the carbon granules 145 are no longer capable of removing a sufficient amount of antimicrobials (e.g., the carbon granules 145 may be past their useful life).

In particular embodiments, following a determination that the carbon granules 145 may no longer be removing the antimicrobials from the antimicrobial composition, the carbon granules 145 may be recycled in a manner that may provide various advantages. For example, the carbon granules 145 may be removed from the container 120, and then the carbon granules 145 may be reanimated, so that they may be used again. In particular embodiments, such a recycling method may reduce the costs associated with the carbon granules 145. For example, instead of an entity having to pay for the disposal of the carbon granules 145 (as may be required by typical carbon capture systems), the reanimated carbon granules 145 (or carbon granules 145 capable of being reanimated) may be traded in to (or sold back to) a carbon supplier, thereby reducing costs associated with antimicrobial capture systems. The carbon granules 145 may be reanimated in any manner. As one example, the carbon granules 145 may be incinerated at a temperature of approximately 900 degrees Celsius (900 degrees Celsius+/−50 degrees Celsius), approximately 875 degrees Celsius, approximately 850 degrees Celsius, approximately 925 degrees Celsius, approximately 950 degrees Celsius, at least approximately 900 degrees Celsius, or at any other temperature that may reanimate the carbon granules 145. Once reanimated, the carbon granules 145 may be resold (or otherwise reused) as reanimated carbon.

The recycling of the carbon granules 145 may be performed by an entity, such as a recycler, a carbon seller, the entity using the carbon granules 145 to remove antimicrobials, any other entity, or any combination of the preceding. In particular embodiments, the container 120 including the used carbon granules 145 may be shipped to, for example, a carbon seller. Such a shipment may involve removing one or more elements from the container 120. For example, the shipment may involve replacing the container lid 140 with a shipment lid. As another example, the shipment may further involve draining all of the liquid 160 from the container 120 (via, for example, an additional drain in the bottom of the container 120, or, as another example, by disconnecting the stand pipe 180 from the drain 175 and draining the liquid 160 via the drain 175) prior to shipping the container 120. The carbon seller (or other entity) may receive the shipment, remove the carbon granules 145, reanimate the carbon granules 145, and resell (or reuse) the carbon granules 145 as reanimated carbon. Furthermore, the carbon seller may, in particular embodiments, refill the container 120 with new (or recycled) carbon granules 145, and ship the container 120 back to the entity using the container 120 to remove antimicrobials.

Modifications, additions, or omissions may be made to the system 10 of FIGS. 1-2 and/or the antimicrobial capture system 115 of FIGS. 3A-3E without departing from the scope of the invention. For example, the container 120 of the antimicrobial capture system 115 may include sensors for sensing the temperature of the liquid 160 and/or heaters for heating the liquid 160.

This specification has been written with reference to various non-limiting and non-exhaustive embodiments. However, it will be recognized by persons having ordinary skill in the art that various substitutions, modifications, or combinations of any of the disclosed embodiments (or portions thereof) may be made within the scope of this specification. Thus, it is contemplated and understood that this specification supports additional embodiments not expressly set forth in this specification. Such embodiments may be obtained, for example, by combining, modifying, or reorganizing any of the disclosed steps, components, elements, features, aspects, characteristics, limitations, and the like, of the various non-limiting and non-exhaustive embodiments described in this specification.

What is claimed is:

1. A container system for removing antimicrobial material from a composition, the container system comprising a container, wherein the container comprises:
   a hollow body containing a plurality of carbon granules and a liquid submerging the carbon granules, wherein the carbon granules are configured to remove the antimicrobial material from the composition;
   a lid removably coupled to the hollow body and configured to seal the hollow body;
   an inlet formed in the lid, the inlet being configured to allow introduction of the composition into the hollow body;
   at least one vent formed in the lid, the at least one vent configured to vent air from the hollow body;
   an agitator at least partially within the hollow body, wherein the agitator is coupled to a control apparatus, the control apparatus being a timing system, wherein the control apparatus is configured to control the agitator and to operate the agitator for a predetermined period of time;
   an outlet configured to drain the liquid from the hollow body; and
   an outlet valve coupled to the outlet.

2. The container system of claim 1, wherein the at least one vent is further configured to allow gas to enter the hollow chamber.

3. The container system of claim 2, wherein the at least one vent comprises a pipe having an outer diameter of from 0.5 inches to 3.0 inches.

4. The container system of claim 3, wherein the pipe is shaped to direct the air upwards from the hollow body of the container through the lid and then redirect the air downward towards a top surface of the lid.

5. The container system of claim 1, wherein the agitator is an air agitation hose configured to release compressed air through one or more holes in the air agitation hose so as to agitate at least a portion of the carbon granules.

6. The container system of claim 5, wherein the air agitation hose has an outer diameter of from 0.5 inches to 3.0 inches.

7. The container system of claim 1, wherein the lid further comprises a liquid level sensor.

8. The container system of claim 7, wherein the liquid level sensor comprises a float valve, a magnetic reed switch sensor, a solid-state electro-optical liquid level sensor, a conductivity-based liquid level sensor, a capacitive liquid level sensor, an ultrasonic liquid level sensor, a piezo-resonant liquid level sensor, or combinations thereof.

9. The container system of claim 7, wherein the liquid level sensor is configured to transmit a signal to a controller when a level of liquid in the hollow body exceeds a predetermined level; and
   wherein the controller is configured to stop flow of liquid through the inlet and/or open the outlet valve in response to the signal.

* * * * *